US009826564B2

(12) United States Patent
Kweon et al.

(10) Patent No.: US 9,826,564 B2
(45) Date of Patent: Nov. 21, 2017

(54) METHOD AND APPARATUS FOR SUBSCRIBING ELECTRONIC DEVICE IN MOBILE COMMUNICATION SYSTEM

(71) Applicant: Samsung Electronics Co., Ltd., Suwon-si, Gyeonggi-do (KR)

(72) Inventors: Kisuk Kweon, Suwon-si (KR); Hyunah Oh, Yongin-si (KR); Franklin Antony, Suwon-si (KR); Jicheol Lee, Suwon-si (KR); Hakyung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/189,539

(22) Filed: Jun. 22, 2016

(65) Prior Publication Data

US 2016/0374134 A1     Dec. 22, 2016

(30) Foreign Application Priority Data

Jun. 22, 2015    (KR) ........................ 10-2015-0088610

(51) Int. Cl.
*H04M 1/66*     (2006.01)
*H04W 76/02*    (2009.01)
(Continued)

(52) U.S. Cl.
CPC ........... *H04W 76/023* (2013.01); *H04L 67/12* (2013.01); *H04W 4/008* (2013.01); *H04W 8/205* (2013.01);
(Continued)

(58) Field of Classification Search
CPC ........................ H04L 12/2818; H04L 12/2825
(Continued)

(56) References Cited

U.S. PATENT DOCUMENTS

| | | | |
|---|---|---|---|
| 8,671,204 B2 | 3/2014 | Srinivasan | |
| 9,363,314 B2 | 6/2016 | Foti | |
| 2006/0178132 A1* | 8/2006 | Tammi | H04L 63/10 455/411 |
| 2011/0028126 A1* | 2/2011 | Lim | H04L 63/0853 455/411 |
| 2011/0119757 A1* | 5/2011 | Bae | H04L 29/12207 726/17 |
| 2011/0126271 A1* | 5/2011 | Kim | H04W 12/06 726/4 |
| 2014/0156082 A1* | 6/2014 | Ha | D06F 33/02 700/275 |

(Continued)

FOREIGN PATENT DOCUMENTS

| | | |
|---|---|---|
| EP | 17722589 A2 | 11/2006 |
| WO | 2013/003822 A1 | 1/2013 |

(Continued)

*Primary Examiner* — Ankur Jain
*Assistant Examiner* — Max Mathew
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A subscriber server supporting subscription of an electronic device in a communication system is provided. The subscriber server includes a transceiver configured to transmit and receive a signal, and a controller configured to receive a first subscription connection request message of the electronic device from a terminal, the first subscription connection request message including subscription terminal information of the terminal and identification information of the electronic device, authenticate a user of the terminal on a basis of the subscription terminal information included in the received first subscription connection request message, and transmit a second subscription connection request message of the electronic device to a support server if the user authentication has succeeded. The subscription terminal information of the terminal is used to acquire subscription information of the electronic device so as to subscribe the electronic device.

20 Claims, 16 Drawing Sheets

(51) Int. Cl.
*H04L 29/08* (2006.01)
*H04W 4/00* (2009.01)
*H04W 8/20* (2009.01)
*H04W 12/06* (2009.01)
*H04W 36/08* (2009.01)
*H04W 4/12* (2009.01)
*H04W 92/18* (2009.01)

(52) U.S. Cl.
CPC ............ *H04W 12/06* (2013.01); *H04W 36/08* (2013.01); *H04W 4/12* (2013.01); *H04W 92/18* (2013.01)

(58) Field of Classification Search
USPC .............................................. 455/41, 1, 41.2
See application file for complete search history.

(56) References Cited

U.S. PATENT DOCUMENTS

| | | |
|---|---|---|
| 2015/0074144 A1 | 3/2015 | Zhang et al. |
| 2016/0150400 A1* | 5/2016 | Cha .................... H04W 76/023 455/418 |
| 2016/0212552 A1* | 7/2016 | Schneider ............ H04R 25/558 |
| 2017/0195030 A1* | 7/2017 | Yoshimura ........... H04B 7/0626 |

FOREIGN PATENT DOCUMENTS

| | | |
|---|---|---|
| WO | 2013/150466 A2 | 10/2013 |
| WO | 2014/026587 A1 | 2/2014 |

* cited by examiner

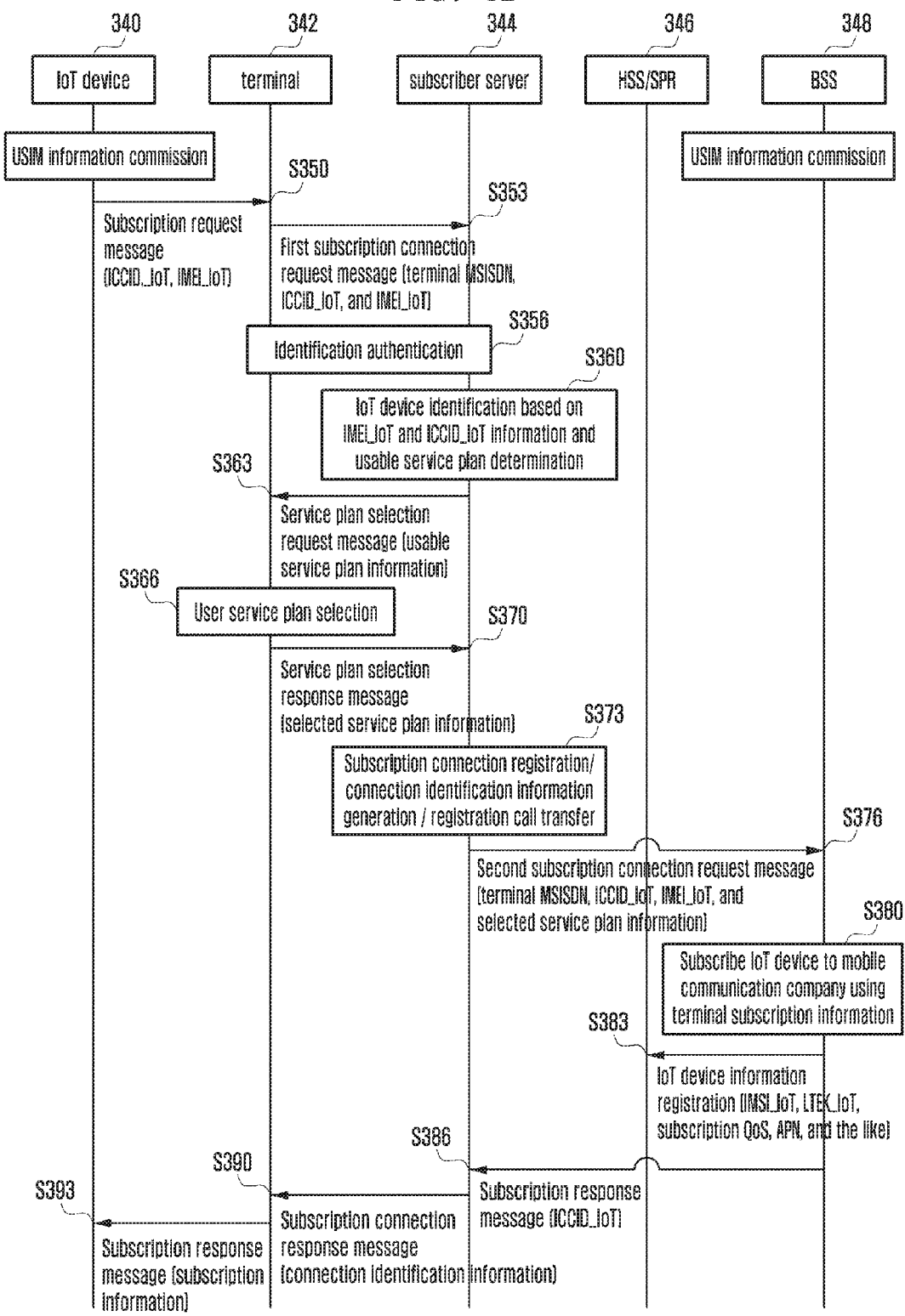

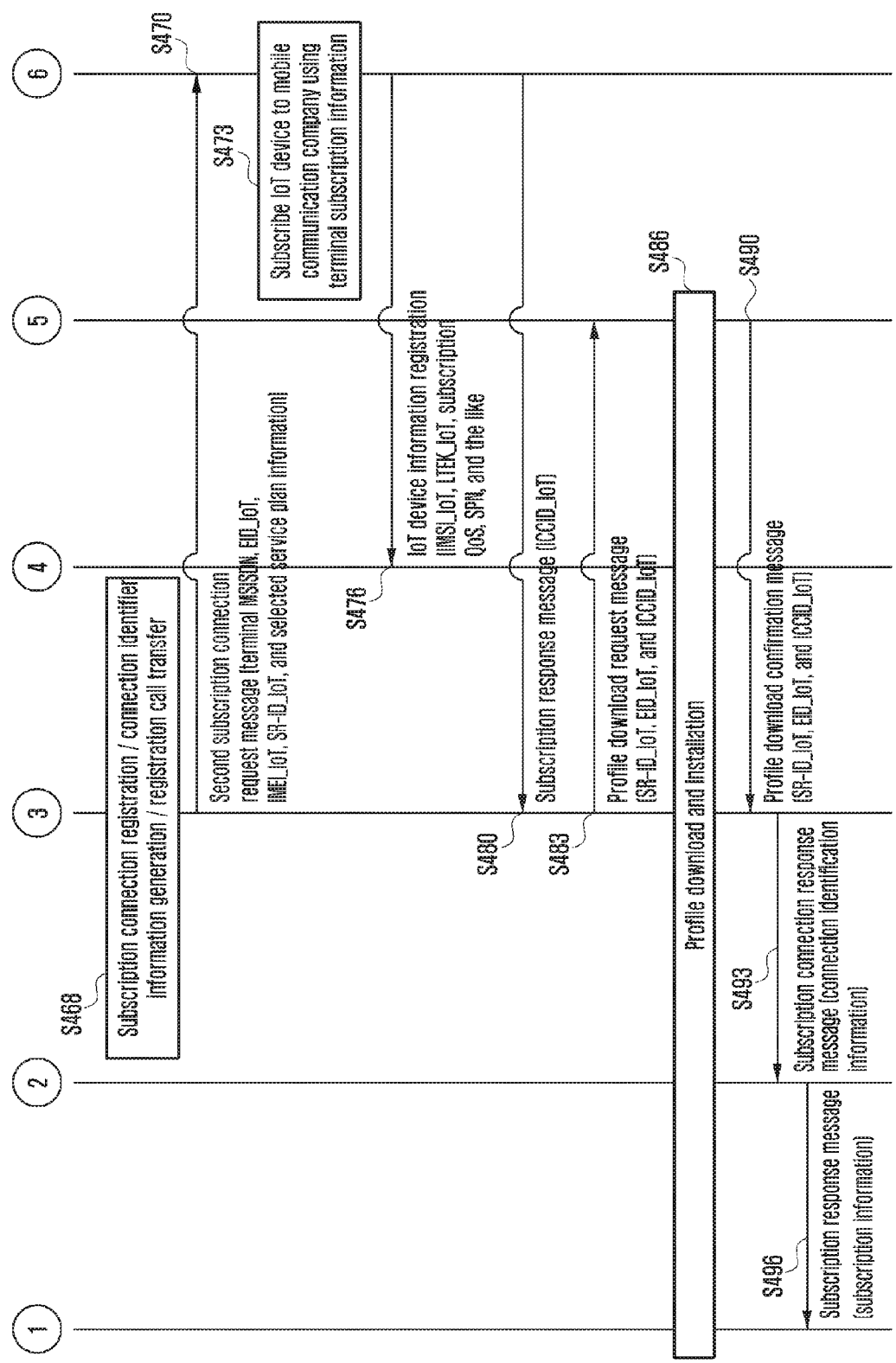

METHOD AND APPARATUS FOR SUBSCRIBING ELECTRONIC DEVICE IN MOBILE COMMUNICATION SYSTEM

CROSS-REFERENCE TO RELATED APPLICATION(S)

This application claims the benefit under 35 U.S.C. §119(a) of a Korean patent application filed on Jun. 22, 2015 in the Korean Intellectual Property Office and assigned Serial number 10-2015-0088610, the entire disclosure of which is hereby incorporated by reference.

TECHNICAL FIELD

The present disclosure relates to a method and an apparatus for subscribing an electronic device in a mobile communication system. More particularly, the present disclosure relates to a method and an apparatus for subscribing an electronic device to receive a service from a mobile communication company.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a result, a user may be in an environment in which the user possesses electronic devices having embedded communication devices in addition to the existing terminal. The electronic devices may be connected to a terminal that has pre-subscribed to a mobile communication company through a short-range wireless communication method to receive a service from the mobile communication company. However, in order to receive the service from the mobile communication company, the electronic devices are required to be located within a predetermined distance from the pre-subscribing terminal, and this may cause mobility of the electronic devices to be hindered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for subscription of an electronic device to a mobile communication company using a pre-subscribing terminal in a mobile communication system. More particularly, an aspect of the present disclosure proposes a method and an apparatus for subscribing an electronic device to a mobile communication company using subscriber information of a mobile communication company of a pre-subscribing terminal.

In accordance with an aspect of the present disclosure, a method for causing a subscriber server to support subscription of an electronic device in a communication system is provided. The method includes receiving a first subscription connection request message of the electronic device from a pre-subscribing terminal, the first subscription connection request message including subscription terminal information of the pre-subscribing terminal and identification information of the electronic device, authenticating a user of the terminal on a basis of the subscription terminal information included in the received first subscription connection request message, and transmitting a second subscription connection request message of the electronic device to a support server if the user authentication has succeeded. The subscription terminal information of the pre-subscribing terminal is used to acquire subscription information of the electronic device so as to subscribe the electronic device.

In accordance with another aspect of the present disclosure, a method for causing a support server to support subscription of an electronic device in a communication system is provided. The method includes receiving a subscription connection request message of the electronic device, which has made a connection request to a pre-subscribing terminal, from a subscriber server, acquiring subscription information of the electronic device on a basis of subscription terminal information of the pre-subscribing terminal included in the received subscription connection request message, and subscribing the electronic device on a basis of subscription information of the electronic device and identification information of the electronic device included in the subscription connection request message. The subscription connection request message of the electronic device is received if the subscriber server authenticates a user of the pre-subscribing terminal.

In accordance with another aspect of the present disclosure, a method for causing a pre-subscribing terminal to support subscription of an electronic device in a communication system is provided. The method includes receiving a subscription connection request message including identification information of the pre-subscribing terminal from the electronic device, transmitting the subscription connection request message of the electronic device to a subscriber server, the subscription connection request message including subscription terminal information of the pre-subscribing terminal and identification information of the electronic device, and receiving a subscription connection response message from the subscriber server if the electronic device has subscribed. The subscription terminal information of the pre-subscribing terminal is used to acquire subscription information of the electronic device so as to subscribe the electronic device.

In accordance with another aspect of the present disclosure, a subscriber server supporting subscription of an electronic device in a communication system is provided. The subscriber server includes a transceiver configured to transmit and receive a signal, and a controller configured to receive a first subscription connection request message of the electronic device from a pre-subscribing terminal, the first subscription connection request message including subscription terminal information of the pre-subscribing terminal and identification information of the electronic device, authenticate a user of the pre-subscribing terminal on a basis of the subscription terminal information included in the received first subscription connection request message, and transmit a second subscription connection request message of the electronic device to a support server if the user authentication has succeeded. The subscription terminal information of the pre-subscribing terminal is used to acquire subscription information of the electronic device so as to subscribe the electronic device.

In accordance with another aspect of the present disclosure, a support server supporting subscription of an electronic device in a communication system is provided. The support server includes a transceiver configured to transmit and receive a signal, and a controller configured to receive a subscription connection request message of the electronic device, which has made a connection request to a pre-subscribing terminal, from a subscriber server, acquire subscription information of the electronic device on a basis of subscription terminal information of the pre-subscribing terminal included in the received subscription connection request message, and subscribe the electronic device on a basis of subscription information of the electronic device and identification information of the electronic device included in the subscription connection request message. The subscription connection request message of the electronic device is received if the subscriber server authenticates a user of the pre-subscribing terminal.

In accordance with another aspect of the present disclosure, a pre-subscribing terminal supporting subscription of an electronic device in a communication system is provided. The pre-subscribing terminal includes a transceiver configured to transmit and receive a signal, and a controller configured to receive a subscription connection request message including identification information of the pre-subscribing terminal from the electronic device, transmit the subscription connection request message of the electronic device to a subscriber server, the subscription connection request message including subscription terminal information of the pre-subscribing terminal and identification information of the electronic device, and receive a subscription connection response message from the subscriber server if the electronic device has subscribed. The subscription terminal information of the pre-subscribing terminal is used to acquire subscription information of the electronic device so as to subscribe the electronic device.

According to the aspects of the present disclosure, it is possible to subscribe an electronic device to a mobile communication company using a pre-subscribing terminal without the necessity of directly visiting a selling agent to subscribe the electronic device to the mobile communication company offline or inputting subscriber information of the electronic device online using the electronic device, and thus convenience is heightened when a user uses the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are diagrams explaining a method for subscribing an IoT device in a mobile communication system according to various embodiments of the present disclosure;

FIGS. 4A to 4C are diagrams explaining a method for subscribing an IoT device in a mobile communication system according to various embodiments of the present disclosure;

Throughout the drawings, it should be noted that like reference numbers are used to depict the same or similar elements, features, and structures.

DETAILED DESCRIPTION

Figure 1A:
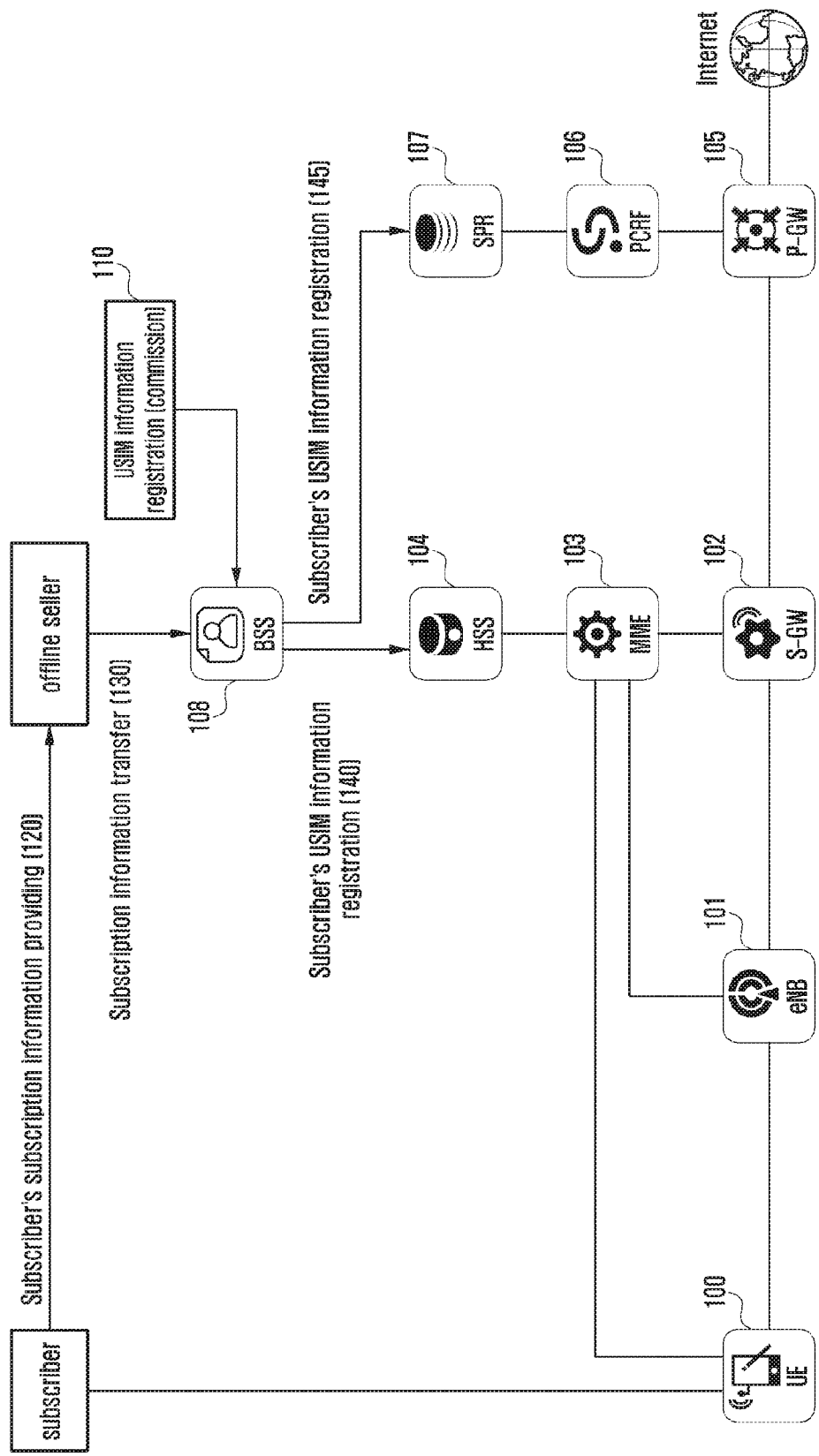
FIGS. 1A and 1B are diagrams explaining a method for subscribing a terminal in a mobile communication system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting of the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

The present disclosure will be described herein with reference to the accompanying drawings illustrating block diagrams and flowcharts for explaining a method and an apparatus for supporting facility control of a terminal according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed by the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order described. For example, two blocks shown in succession may in fact be executed substantially concurrently or the blocks may sometimes be executed in the reverse order, depending upon the functionality involved.

The term "unit," as used in an embodiment, means, but is not limited to, a software or hardware component, such as a field programmable gate array (FPGA) or application specific integrated circuit (ASIC), which performs certain tasks. However, a unit does not mean that it is limited to software or hardware. A unit may advantageously be configured to reside on the addressable storage medium and configured to be executed by one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, components and units may be implemented to reproduce one or more CPUs in a device or a security multimedia card.

In the following description, the term "subscription identification information" means identification information that is required when a terminal subscribes to a mobile communication system. The subscription identification information may include universal subscriber identity module (USIM) information that is provided to the terminal when the terminal subscribes to the mobile communication system. More specifically, the subscription identification information may include an international mobile subscriber identity (IMSI) included in the USIM information, an integrated circuit (IC) card identifier (ICCID), and a long term evolution (LTE) security key (LTE K) value. The IMSI may be an inherent 15-digit identification number allocated to the terminal during a global system for mobile communications (GSM) service subscription, and the identification number is composed of a mobile country code, a mobile network code, a mobile subscriber identification number, and a country mobile subscriber identification number. The ICCID may be an inherent number of the USIM that is provide to the terminal, and the LTE K may be information that is used to pass through an authentication process with the mobile communication system.

The term "subscription terminal information" means information that is given to a subscribing terminal. The subscription terminal information may include, for example, a mobile station international integrated service digital network (ISDN) Number (MSISDN). The MSISDN generally means a mobile station International ISDN number, and means a phone number in a GSM network. The MSISDN may be composed of a country code, a network code, and a directory number.

Further, the term "terminal identification information" means an identifier for inherently identifying the terminal. That is, the terminal identification information may be a value that is generated during manufacturing, and represents a terminal model name and a serial number. The terminal identification information may include, for example, international mobile equipment identity (IMEI).

In the present disclosure, the terminal may generally include a mobile terminal, and may indicate a device that has pre-subscribed to the mobile communication system to receive a service that is provided from the mobile communication system. The mobile terminal may include a smart device, such as a smart phone or a tablet personal computer (PC). However, the present disclosure is not limited thereto.

In the present disclosure, an electronic device may include a device that is communicable with an electronic device or a mobile communication system. The communicable electronic device may be called an IoT device. The IoT device may include, in addition to a smart phone that is developed from the existing portable phone, a wearable device in a body wearable type, a connected car in which communication is added to a vehicle, and a smart metering. The wearable device may be attached to a user's body to transfer user's information to a temperature adjustment device. The wearable device may be in a glass attachment, a bracelet, an armband, or a pendent type. The above-enumerated electronic devices are exemplary, and the present disclosure is not limited thereto.

The IoT device may communicate with a user's pre-subscribing terminal using a short-range wireless communication method. The short-range wireless communication method may include Bluetooth (BT), WI-FI, WI-FI-Direct, Zigbee, or near field communication (NFC). Further, the IoT device may have an embedded communication modem separately from the user's pre-subscribing terminal to perform direct communication with the mobile communication system.

Figure 1B:
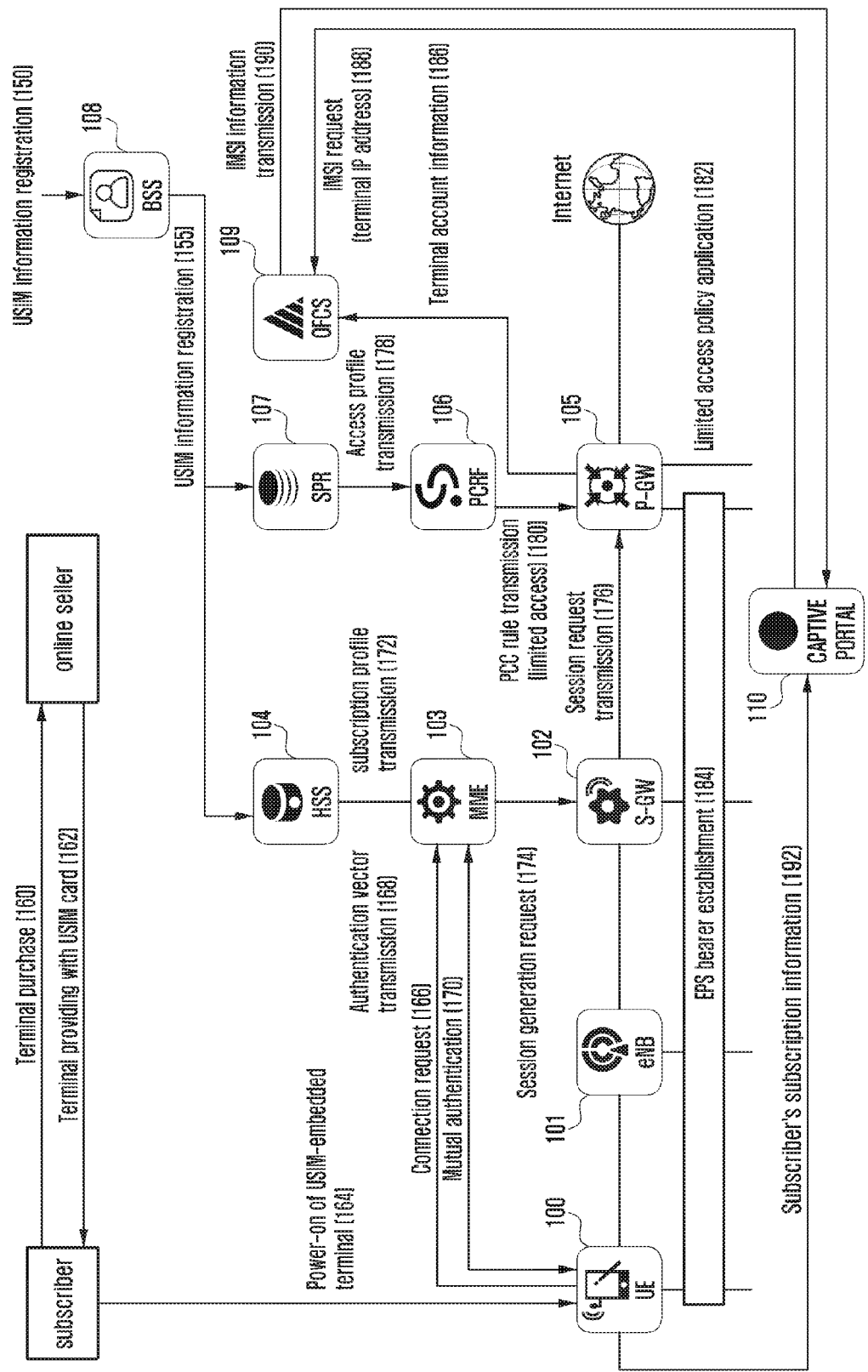

FIGS. 1A and 1B are diagrams explaining a method for subscribing a terminal in a mobile communication system according to various embodiments of the present disclosure.

More specifically, FIG. 1A is a diagram explaining offline subscription method, and FIG. 1B is a diagram explaining online subscription method.

For convenience in explanation, although FIGS. 1A and 1B illustrate an LTE or LTE advance (LTE-A) system, the primary subjects according to embodiments of the preset disclosure are applicable even to other communication/computer systems having similar technical backgrounds and system types with slight modifications in a range that does not greatly deviate from the range of the embodiments of the present disclosure, and this could be achieved by the judgment of those skilled in the art to which the embodiments of the present disclosure pertain.

Referring to FIGS. 1A and 1B, a 3GPP mobile communication system, in particular, an LTE system, may include a next-generation base station (evolved Node B (eNB), evolved universal terrestrial radio access networks (EU-TRAN), or Node B) 101 and a serving gateway (S-GW) 102, and a terminal, that is, user equipment (UE), 100 can be connected to an external network through the eNB 101, the S-GW 102, and a packet data network (PDN) gateway (P-GW) 105. The P-GW normally has a policy and charging enforcement function (PCEF), and if the PCEF is implemented separately from the P-GW, in an embodiment of the present disclosure, the P-GW may be replaced by the PCEF.

A policy and charging rules function (PCRF) 106 may be a device that controls user's policy related to the quality of service (QoS), and a policy and charging control (PCC) rule that corresponds to the policy may be transferred to the P-GW 105 to be applied thereto.

A subscriber profile repository (SPR) 107 stores a subscriber profile for subscriber policies and billings. The subscriber profile includes basic service good information to which each communication terminal 100 has subscribed and service permission amount information, and is transmitted to the PCRF 106 to be referred to in determining the PCC rule.

The eNB 150 may be a radio access network (RAN) node, and performs functions corresponding to a radio network controller (RNC) of a UTRAN system and a base station controller (BSC) of a GSM enhanced data for GSM evolution (EDGE) radio access network (GERAN) system. The eNB 101 may be connected to the UE through a wireless channel, and may play a role that is similar to the role of the existing radio network controller (RNC)/base station controller (BSC). The eNB 150 may be called a base station, and hereinafter, the terms "eNB" and "base station" may be mixedly used in the present disclosure. Further, the base station 150 may simultaneously use several cells.

The S-GW 102 may be a device that stores a data bearer, and generates or deletes a data bearer context in accordance with the control of a mobility management entity (MME).

A business support server (BSS) 108 corresponds to a support server of the mobile communication company, and in the present disclosure, the terms "BSS" and "support server" can be mixedly used.

A home subscriber server (HSS) 104 stores subscriber's subscription information and configuration information, such as subscriber's identifier, number and addressing information, security information, location information, and profile information. The HSS 104 may be used to support session and call processes of each network entity. One or more HSSs 104 may exist in the home network, and the number of HSSs 104 may differ in accordance with the number of mobile subscribers, ability of the network device, and detailed networking structure.

According to the offline subscription method as shown in FIG. 1A, a user directly visits an offline seller, and purchases a communication device and a UMTS subscriber identity module (USIM).

The mobile communication company registers (commissions) the USIM information 110 in the BSS 108 before distributing the communication device and the USIM card to a mobile communication agent. The stored USIM information includes an ICCID that includes information for discriminating the USIM card, an IMSI that includes information for discriminating the user, and LTE K information that is used to authenticate a user. Further, the USIM card may selectively include an IMEI that includes terminal identification information.

The offline seller that has received the subscription information at operation (120) transfers the subscription information, the terminal identification information, and the ICCID of the USIM to be embedded in the terminal to the BSS 108 at operation (130). The terminal information may be information on the terminal that is subject to subscription, and may include the IMEI. Thereafter, the BSS may register (provision) the subscriber's USIM information in the HSS 104 and the SPR 107 using the pre-registered ICCID value at operation (140) and at operation (145), respectively. Through this, the subscriber registers the terminal 100 in the mobile communication company, and receives an opened terminal 100 and USIM card. The subscriber may receive a service from the mobile communication company using the terminal 100 having the USIM card embedded therein.

According to the online subscription method as shown in FIG. 1B, a user directly opens a terminal using the terminal and the USIM card purchased from an online seller through connection to a service provider's portal server.

First, for the online subscription, the user registers (commissions) the USIM information in not only the BSS 108 but also the HSS 104 and the SPR 107 at operation (153) and operation (155), respectively. Thereafter, a subscriber who intends to subscribe the terminal 100 purchases the terminal from the online seller at operation (160), and the online seller provides the terminal 100 together with the USIM card at operation (162). Thereafter, the user embeds the USIM card in the terminal 100, and turns on an electric power at operation (164). The terminal 100 transmits a connection request message that includes the IMSI value to the MIME 103 at operation (166), and the MME 103 receives authentication vectors for the corresponding user IMSI from the HSS 104 at operation (168). Referring to operation (155), since the IMSI that is the USIM information of the corresponding subscriber and the LTE K have already been registered in the HSS 104, the HSS 104 can generate and transfer the authentication vector to the MME 103 with no problem.

Thereafter, the terminal 100 and the MME 103 perform mutual authentication with each other at operation (170). If the authentication of the terminal 100 and the MME 103 has succeeded, the MME 103 receives a subscription profile that includes QoS information (QoS quality Identifier (QCI)) to be used to generate an evolved packet system (EPS) bearer, allocation retention priority (ARP), access point name-aggregate maximum bit rate (SPN-AMBR) uplink/downlink (UL/DL), and UE-AMBR UL/DL from the HSS 104 at operation (172). Further, the MME 103 transmits an EPS bearer generation request for the subscriber to the S-GW 102 at operation (174). The S-GW 102 transmits the EPS bearer generation request for the subscriber to the P-GW 105 at operation (176). The reason why it is possible to connect to the network although the user has not yet subscribed therein is that the USIM information, of which the subscription procedure has not been completed, is registered in the HSS 104.

Thereafter, the P-GW 105 requests information on the PCC rule from the PCRF 106, and the PCRF 106 requests subscriber information that is stored in the SPR 107 to receive an access profile at operation (178). Thereafter, an access policy is determined on the basis of the access profile that is received from the SPR 107, and the PCC rule is transmitted to the P-GW 105 at operation (180). The access policy is determined to permit only limited access to a captive portal in order to enable a non-subscribing user to connect to the network.

Thereafter, an EPS bearer is generated between the terminal 100 and the P-GW 105 at operation (184) by applying the limited access policy at operation (182) on the basis of the QoS information received from the HSS 104 and the PCRF 106. The P-GW is provided with deep packet inspection (DPI) equipment, which transfers only packets provided to the captive portal through data (payload) included in user's packets, and drops or retransmits the remainder to the captive portal. Thereafter, the terminal successfully connects to the network to set the EPS bearer for communication, and for billing, and the P-GW 105 transmits accounting data including a terminal internet protocol (IP) address and IMSI to an offline charging server (OFCS) 109 at operation (186).

A user who connects to a server of a captive portal of the mobile communication company inputs subscription information including personal information, payment information, terminal information, and service plan information at operation (192). The server of the captive portal is not equipment of the mobile communication system, for example, LTE equipment, and thus does not include user's IMSI information that is necessary for subscription. Accordingly, the captive portal server transmits an IMSI information request message including a terminal IP address through the OFCS and a separately defined interface at operation (188), and receives a user IMSI value at operation (190). The captive portal server transmits the subscription information input by the user and the received IMSI value to the BSS 108 (not illustrated). The BSS 108 stores the subscription information that is received from the captive portal server, and then registers (provisions) the information in the SPR 107.

Thereafter, the SPR 107 notifies the PCRF 106 that profile information of the corresponding terminal has been changed, and the PDRF 106 transfers a new PCC rule to the P-GW 105. That is, the corresponding user can use the service through the EPS bearer to which full-access policy is applied other than the EPS bearer to which the limited access policy is applied.

As described above, FIGS. 1A and 1B explain the mobile communication company subscription method of the terminal in the related art. However, recently, various IoT devices including the existing mobile terminal can be purchased online, and thus, if it is required for the user to visit the mobile communication agent online in order to register the IoT device that is purchased online, this may cause inconvenience to the user. Further, in the case of using the online subscription method, it is quite convenient to the user, but the mobile communication company has a problem that network complexity becomes greater in order to provide the online subscription method, and this may still cause inconvenience to the user in performing the subscription procedure.

More specifically, first, in order to enable a non-subscribing user to access the captive portal server to perform the subscription procedure, the non-subscribing USIM information should be registered in the HSS and SPR equipment. Second, as described above with reference to FIG. 1B, DPI support equipment that can inspect a hypertext transfer protocol (HTTP) uniform resource locator (URL) is required for hot-lining (HTTP redirection). Third, it is required to construct and manage the captive portal server for a user's online subscription. Fourth, in order for the portal server to acquire the IMSI value of the user terminal during subscription of the terminal, interlocking (nonstandard interlocking) is necessary between the portal server and the OFCS. Last, it is quite inconvenient for a user to input the user's personal information (e.g., name, address, email address, and payment information) to the captive portal server using an IoT device generally having an inconvenient user interface (UI) unlike the mobile terminal. Hereinafter, in order to solve the above-described problem, a method for supporting subscription of an electronic device including an IoT device in a mobile communication system will be described.

Figure 2:
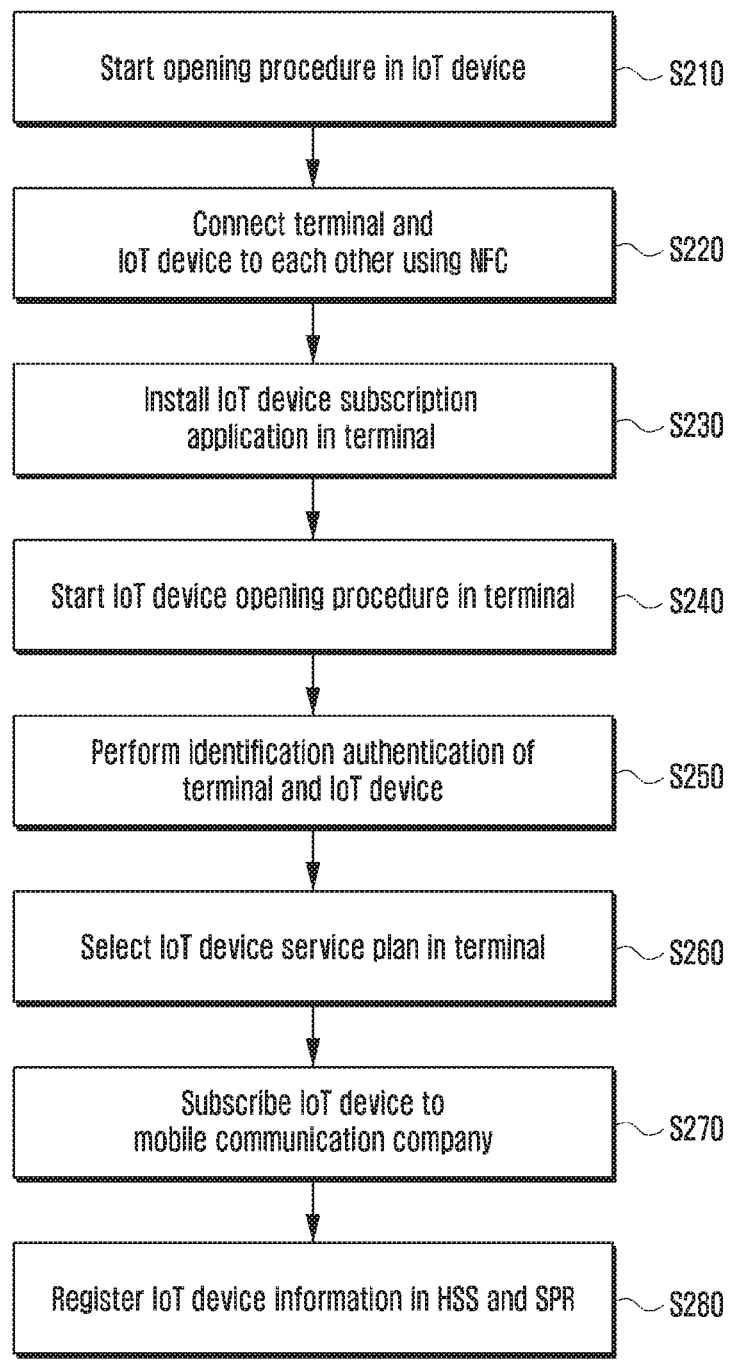
FIG. 2 is a flowchart explaining a method for causing a terminal to support subscription of an IoT device in a mobile communication system according to an embodiment of the present disclosure.

FIG. 2 is a flowchart explaining a method for supporting subscription of an IoT device in a mobile communication system according to an embodiment of the present disclosure.

At operation S210, the IoT device may start an opening procedure. That is, if a user having a non-subscribing IoT device turns on the power of the IoT device, a phrase for guiding an opening of a mobile communication company is displayed on the IoT device. Thereafter, the IoT device may selectively display a phrase for a guiding setting so that the IoT device and a pre-subscribing terminal can perform short-range wireless communication. The short-range wireless communication may include a communication method for enabling the IoT device and the terminal to perform communication. The short-range wireless communication method may include, for example, Bluetooth, WI-FI, Zigbee, or NFC. Hereinafter, explanation will be made on the assumption that NFC is used as the short-range wireless communication method.

At operation S220, the terminal may connect to the IoT device using the NFC. That is, after both the terminal and the IoT device are set to activate the NFC, the terminal and the IoT device can be connected to each other though the NFC by approaching or contacting the terminal and the IoT device with each other.

At operation S230, the terminal may install a subscription application of the IoT device. Information on the subscription application may be received from the IoT device that is connected through the NFC. Using the subscription application, the terminal may select identity authentication or a service plan to be used by the IoT device.

At operation S240, the terminal may start an opening procedure with the IoT device that is connected using the NFC. In this case, selectively, the terminal may display a message for guiding that there is an electronic device that requests subscription to a user who proceeds with the subscription, and may display a message to inquire the user whether to start the opening procedure. The message to inquire whether to start the opening procedure may include selection buttons in the form of boxes of "Yes" and "No." If the user inputs the setting to notify of the start of the opening procedure, the terminal may start the opening procedure of the IoT device.

Thereafter, at operation S250, the terminal and the IoT device may perform identity authentication. The identity authentication means to authenticate that a subscriber of the mobile communication company for the terminal and the user who proceeds with the subscription of the IoT device are the same. That is, the identity authentication is to authenticate whether an upright user of the terminal proceeds with the opening procedure of the IoT device. The identity authentication may be performed using a resident registration number for identifying a terminal user and other replacement methods. The identity authentication is to authenticate the user of the terminal and the IoT device, and in the present disclosure, it may be mixedly used with user authentication.

Thereafter, at operation S260, the terminal may select a service plan of the IoT device. More specifically, if the identity authentication for the subscription of the IoT device is completed, the terminal may receive at least one piece of service plan information that can be used by the IoT device from the network of the mobile communication company, and then may display the received service plan information on a screen. The terminal may receive an input for selecting one of the received service plan information from the user. The terminal may transmit the service plan information that is selected by the user to the mobile communication system.

Thereafter, at operation S270, the BSS may subscribe the IoT device in the mobile communication company using the subscriber information of the connected terminal. That is, according to the present disclosure, the user can easily subscribe the IoT device in the mobile communication company only through the identity authentication and service plan selection procedure using the connected pre-subscribing terminal without the necessity of separately visiting an offline seller or separately inputting the subscription information of the IoT device in order to register the IoT device that is purchased from an online seller in the mobile communication company.

Thereafter, at operation S280, the BSS may register the information of the IoT device in the HSS and the SPR. The information of the IoT device may include the USIM information that is the identification information of the IoT device. More detailed explanation thereof will be made later.

Figure 3A:
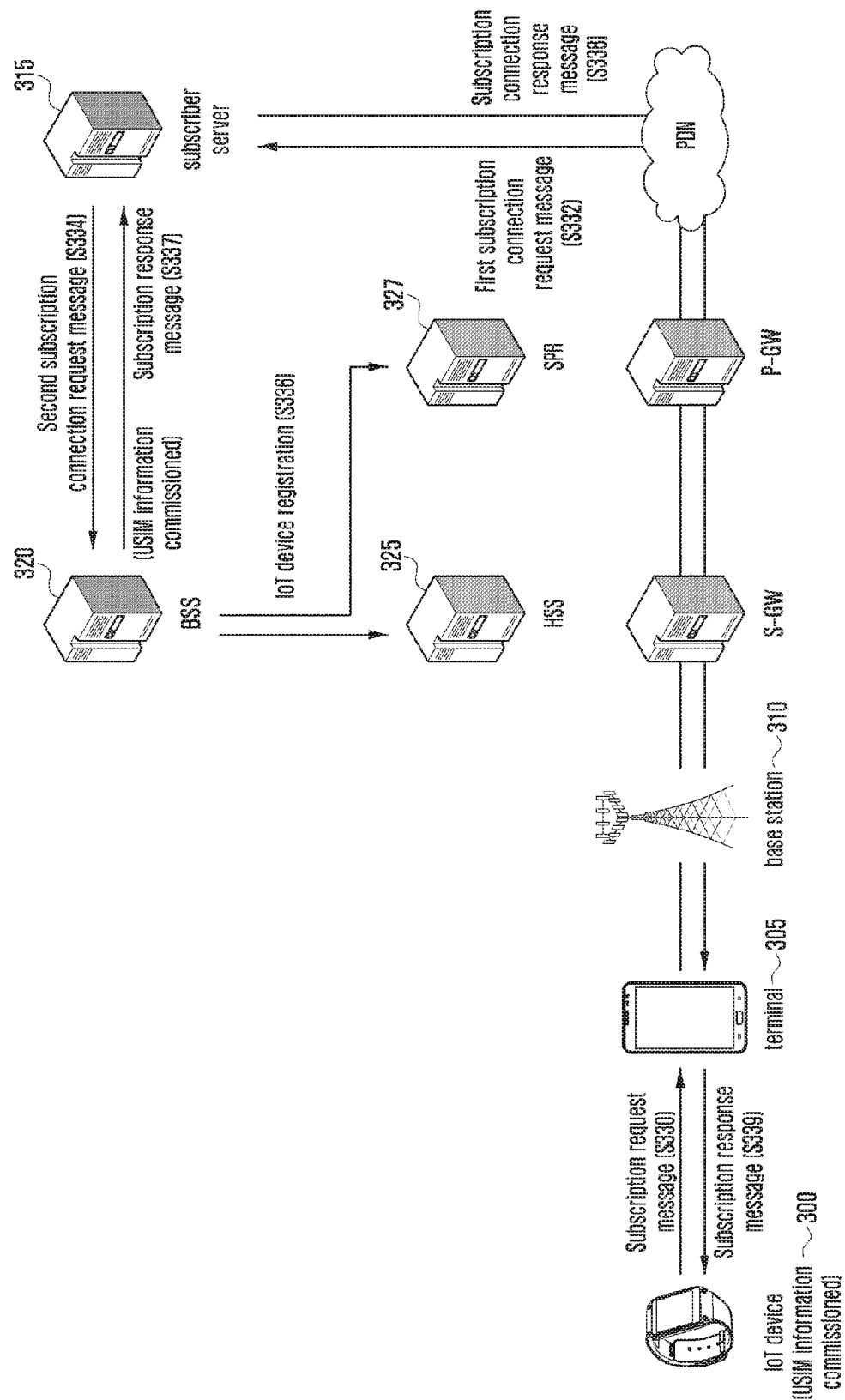

FIGS. 3A and 3B and 4A to 4C are diagrams explaining a method for subscribing an IoT device in a mobile communication system according various embodiments of the present disclosure. Referring to FIGS. 3A and 3B, a universal integrated circuit card (UICC) is embedded in the IoT device, and referring to FIGS. 4A to 4C, an embedded UICC (eUICC) is embedded in the IoT device.

The UICC may be a smart card that can be inserted into a terminal to be used as a module for user authentication. The UICC includes USIM information that may be subscription identification information for the user authentication. The UICC may store a user's personal information and service provider information of a mobile communication service provider to which a user subscribes. If the user embeds the UICC in the user terminal, user authentication is automatically performed using information stored in the UICC, and thus the user can conveniently use the terminal. Further, when replacing the terminal, the user can embed the UICC that is taken away from the existing terminal in a new terminal to facilitate the terminal replacement.

The eUICC may be a UICC that is built in a terminal in a non-detachable manner for miniaturization of the terminal. In this case, in order to solve the problem that the terminal should be used only for a specific mobile communication service provider from the time when the terminal is manufactured, the eUICC is set so that subscriber information of several mobile communication service providers can be remotely updated. That is, the user can open the terminal regardless of the mobile communication service providers. Accordingly, if the eUICC is embedded, unlike a case where the UICC is embedded, the USIM information is not pre-registered in the IoT device.

FIGS. 3A and 3B are diagrams explaining a method for subscribing an electronic device in a mobile communication system according to various embodiments of the present disclosure.

More specifically, FIG. 3A is a diagram explaining a method for subscribing an IoT device having an eUICC in a mobile communication system, and FIG. 3B is a diagram explaining in detail operations for respective nodes in FIG. 3A.

Referring to FIG. 3A, non-subscribing USIM information is registered (commissioned) in a BSS 320 and an IoT device 300. At operation S330, the IoT device 300 may transmit a subscription request message to a terminal 305. The IoT device 300 may transmit the subscription request message using a short-range wireless communication method. Hereinafter, explanation will be made on the assumption that the IoT device 300 transmits the subscription request message using NFC that is a kind of short-range wireless communication method. The IoT device 300 may transmit the subscription request message by approaching or contacting the terminal 305 using the NFC. The subscription request message may include identification information of the IoT device 300 that may be information required to subscribe the IoT device 300. The identification information may include subscription identification information and terminal identification information. The subscription information may include the USIM information, and the USIM information may include IMSI, ICCID, and LTE K. The terminal identification information may include IMEI.

If the subscription request message is received from the IoT device 300, the terminal may install a subscription application of the IoT device on the basis of the information that is received through the NFC communication between the IoT device 300 and the terminal 305.

At operation S332, the terminal that has received the subscription request message may transmit a first subscription connection request message to a subscriber server 315 through a mobile communication network. That is, the terminal 305 may transmit the first subscription connection request message to the subscriber server 315 through a base station 310, S-GW, P-GW, and a subsequent PDN network. The first subscription connection request message may include identification information of the IoT device 300 included in the subscription request message that the terminal 305 has received from the IoT device 300. The first subscription connection request message may further include subscription terminal information of the terminal 305. The subscription terminal information means information that is given to the subscribing terminal. The subscription terminal information may include, for example, a MSISDN. Further, the first subscription connection request message may include an ICCID that may be the identification information of the terminal 305.

If the first subscription connection request message is received, the subscriber server 315 may perform identity authentication through the terminal 305 on the basis of information included in the first subscription connection request message. The identity authentication means to authenticate that a subscriber of the mobile communication company for the terminal and the user who proceeds with the subscription of the IoT device are the same. That is, the identity authentication is to authenticate whether an upright user of the terminal proceeds with the opening procedure of the IoT device. The identity authentication may be performed using a resident registration number for identifying the terminal user and other replacement methods. In this case, the terminal 305 may support the identity authentication procedure of the subscriber server 315 using the installed subscription application. The identity authentication may be performed using the resident registration number for identifying the terminal user and other replacement methods.

Further, the subscriber server 315 may transmit at least one piece of service plan information that can be used in the corresponding IoT device 300 through the IMEI of the IoT device 300 to the terminal 305. Thereafter, the terminal 305 may receive the at least one piece of service plan information that can be used by the IoT device from the subscriber server 315, and then may display the received service plan information on a screen. In this case, the terminal 305 may operate to select the service plan information using the installed subscription application. That is, the terminal may display the received service plan information using the installed subscription application, and may receive an input for selecting one of the received service plan information from the user. Thereafter, the terminal may transmit the service plan information that is selected by the user to the subscriber server 315.

If the identity authentication through the terminal 305 has succeeded, at operation S334, the subscriber server 315 may connect the IoT device 300 and the terminal 305 to each other, and may transmit a second subscription connection request message to the BSS 320. That is, in the present disclosure, the subscription connection request message that the terminal 305 transmits to the subscriber server 315 is called the first subscription connection request message, and the subscription connection request message that the subscriber server 315 transmits to the BSS 320 is called the second subscription connection request message.

In the same manner as the first subscription connection request message, the second subscription connection request message may include identification information of the IoT device 300 and subscription terminal information of the terminal 305. That is, the subscription connection request message may include ICCID of the IoT device 300, IMEI, and MSISDN of the terminal 305. Further, the second subscription connection request message may include ICCID that is the identification information of the terminal 305. Further, the second subscription connection request message may further include service plan information of the IoT device 300 which is selected by the user and which the subscriber server 315 receives from the terminal 305.

Further, the subscriber server 315 may transmit information indicating that the UICC is embedded in the IoT device 300 to the BSS 320. That is, the subscriber server 315 may confirm whether the IoT device 300 has the embedded UICC on the basis of the information that is included in the received subscription connection request message, and may notify the BSS 320 of the result of confirmation. This is because the operation that the BSS 320 subscribes the IoT device 300 in the mobile communication company differs depending on whether the IoT device has the embedded eUICC or the embedded UICC.

Further, if the identity authentication through the terminal 305 has succeeded, the subscriber server 315 may allocate a connection identifier (ID) for the IoT device 300 and the terminal 305. The connection ID may be used to perform changing of the service plan information of the IoT device 300, unsubscribing, and the like through the terminal 305. The connection ID for identifying the connection between the terminal and the IoT device 300 may be connection identification information, and in the present disclosure, for convenience in explanation, the two terms are mixedly used. The change of the service plan information using the connection identification information and unsubscribing procedure will be described later with reference to FIGS. 5A and 5B and 6A and 6B.

If the second subscription connection request message is received, the BSS 320 may subscribe the IoT device 300 in the mobile communication company using the pre-subscribing information of the terminal 305 in the mobile communication company. More specifically, the BSS 320 may enquire the subscription information of the terminal using at least one of MSISDN and ICCID values of the terminal 305 included in the received second subscription connection request message. More specifically, the subscription information may include user's name, resident registration number, address, and email address that are user's personal information. Further, the subscription information may include information on a payment method of the terminal 305. Further, the BSS 320 may enquire the USIM information pre-registered (commissioned) in the BSS 320 using the ICCID value of the IoT device 300 that is included in the received second subscription connection request message. That is, the BSS 320 may enquire the USIM information that is allocated to the IoT device 300 using the ICCID value that may be information for discriminating the USIM card.

Thereafter, the BSS 320 may subscribe the IoT device 300 in the mobile communication company through the service plan information that is selected by the user and is included in the received second subscription connection request message, the terminal information that is obtained through the IMEI of the IoT device 300, previously enquired user information, and the USIM information of the IoT device 300.

Thereafter, at operation S336, the BSS may register (provision) information that includes the USIM information of the IoT device 300 in the HSS 325 and the SPR 327. More particularly, the BSS 320 may register IMSI and LTE K included in the USIM information of the IoT device in the HSS 325. Further, the BSS may further register QoS information for the IoT device 300 and information on an access point name (APN) that may be a service name to be used by the subscriber. Further, if the BSS 320 subscribes the IoT device 300 in the mobile communication company, at operation S337, the BSS 320 may transmit a subscription response message that notifies of the subscription to the subscriber server 315. In this case, at operation S338, the subscriber server 315 may transmit a subscription connection response message to the terminal 305 through the mobile communication network. In this case, the subscriber server 315 may transmit the subscription connection response message, which includes the connection identification information that is generated when the user authentication has succeeded, to the terminal 305. The terminal 305 that has received the subscription connection response message may display a message for notifying of completion of the subscription on the screen. Further, at operation S339, the terminal 305 may notify of the completion of the subscription through transmission of the subscription response message including the connection identification information that is received from the subscriber server 315. If the subscription response message is received, the IoT device 300 may selectively display a message for notifying the user that the IoT device 300 has subscribed in the mobile communication company.

Referring to FIG. 3B, respective node operations of an IoT device 340, a terminal 342, a subscriber server 344, an HSS and SPR 346, and a BSS 348, to subscribe the IoT device 340 in a mobile communication company will be described.

USIM information is registered (commissioned) in the IoT device 340 and the BSS 348. At operation S350, the IoT device 340 may transmit a subscription request message to the terminal 342. The subscription request message may include ICCID (ICCID_IoT) and IMEI (IMEI_IoT) of the IoT device 340. At operation S353, the terminal 342 may transmit a first subscription connection request message to the subscriber server 344. The first subscription connection request message may include MSISDN of the terminal 342, the ICCID_IoT and the ICCID that is the identification information of the terminal 342.

At operation S356, the terminal 342 and the subscriber server 344 may perform identity authentication. The identity authentication means to authenticate that a subscriber of the mobile communication company for the terminal and the user who proceeds with the subscription of the IoT device are the same. That is, the identity authentication is to authenticate whether an upright user of the terminal proceeds with the opening procedure of the IoT device.

At operation S360, the subscriber server 344 may identify the IoT device on the basis of the IMEI_IoT and ICCID_IoT information, and may determine at least one usable service plan. At operation S363, the subscriber server 344 may transmit a service plan selection request message to the terminal 342. The service plan selection request message may include information on at least one determined usable service plan.

At operation S366, the terminal 342 may select a user service plan. More particularly, the terminal may display information on at least one determined usable service plan, which is included in the received service plan selection request message, on the screen. Through reception of a user's input for selecting one of the at least one service plan displayed on the screen, the terminal 342 may select the user service plan. Thereafter, at operation S370, the terminal 342 may transmit a service plan selection response message to the subscriber server 344. At operation S373, if the identity authentication has succeeded, the subscriber server 344 may register subscription connection between the IoT device 340 and the terminal 342, and may generate connection identification information. Further, the subscriber server may transfer a registration call. The connection identification information may be used later to perform the procedures of the change of the service plan information and unsubscribing of the IoT device 300.

Thereafter, at operation S376, the subscriber server 344 may transmit a second subscription connection request message to the BSS 348. The second subscription connection request message may include MSISDN of the terminal, ICCID_IoT, IMEI_IoT, and selected service plan information that is received by the subscriber server 344. Further, the second subscription connection request message may include ICCID that is the identification information of the terminal 342.

At operation S380, the BSS 348 may subscribe the IoT device 340 in the mobile communication company using the subscription information of the terminal. More specifically, the BSS 348 may acquire the subscription information of the IoT device 340 using the subscription information of the terminal 342 that is enquired using at least one of the MSISDN and ICCID values of the terminal 342. Further, the BSS 320 may enquire the USIM information preregistered (commissioned) in the BSS using the ICCID value of the IoT device 340 that is included in the receive second subscription connection request message. Thereafter, the BSS 320 may subscribe the IoT device 340 in the mobile communication company through the service plan information that is selected by the user and is included in the received second subscription connection request message, the terminal information that is obtained through the IMEI of the IoT device 340, previously enquired user information, and the USIM information of the IoT device 340.

Thereafter, at operation S383, the BSS 348 may register (provision) the USIM information of the enquired IoT device 304, QoS, and APN information in the HSS and SPR 346.

Thereafter, at operation S386, the BSS 348 may transmit a subscription response message notifying that the IoT device has subscribed in the mobile communication company to the subscriber server 344. The subscription response message may include ICCID included in the USIM information of the IoT device.

At operation S390, the subscriber server 344 may transmit a subscription connection response message to the terminal 342. The subscription connection response message may include connection identification information that is generated by the subscriber server 344 at operation S373. The terminal 342 may perform procedures of changing the service plan information of the IoT device 340 connected later and mobile communication company unsubscribing using the received connection identification information. At operation S393, the terminal may transmit the subscription response message to the IoT device 340. The subscription response message may be a message notifying the IoT device that the IoT device 340 has subscribed in the mobile communication company, and may include subscription information of the IoT device. Selectively, the terminal 342 and the IoT device 340 that have received the subscription connection response message or the subscription response message may display a message for notifying the user that the subscription of the IoT device 300 has been completed.

According to the present disclosure, the user can easily subscribe the IoT device in the mobile communication company only through the identity authentication and service plan selection using the pre-subscribing terminal.

Figure 4A:
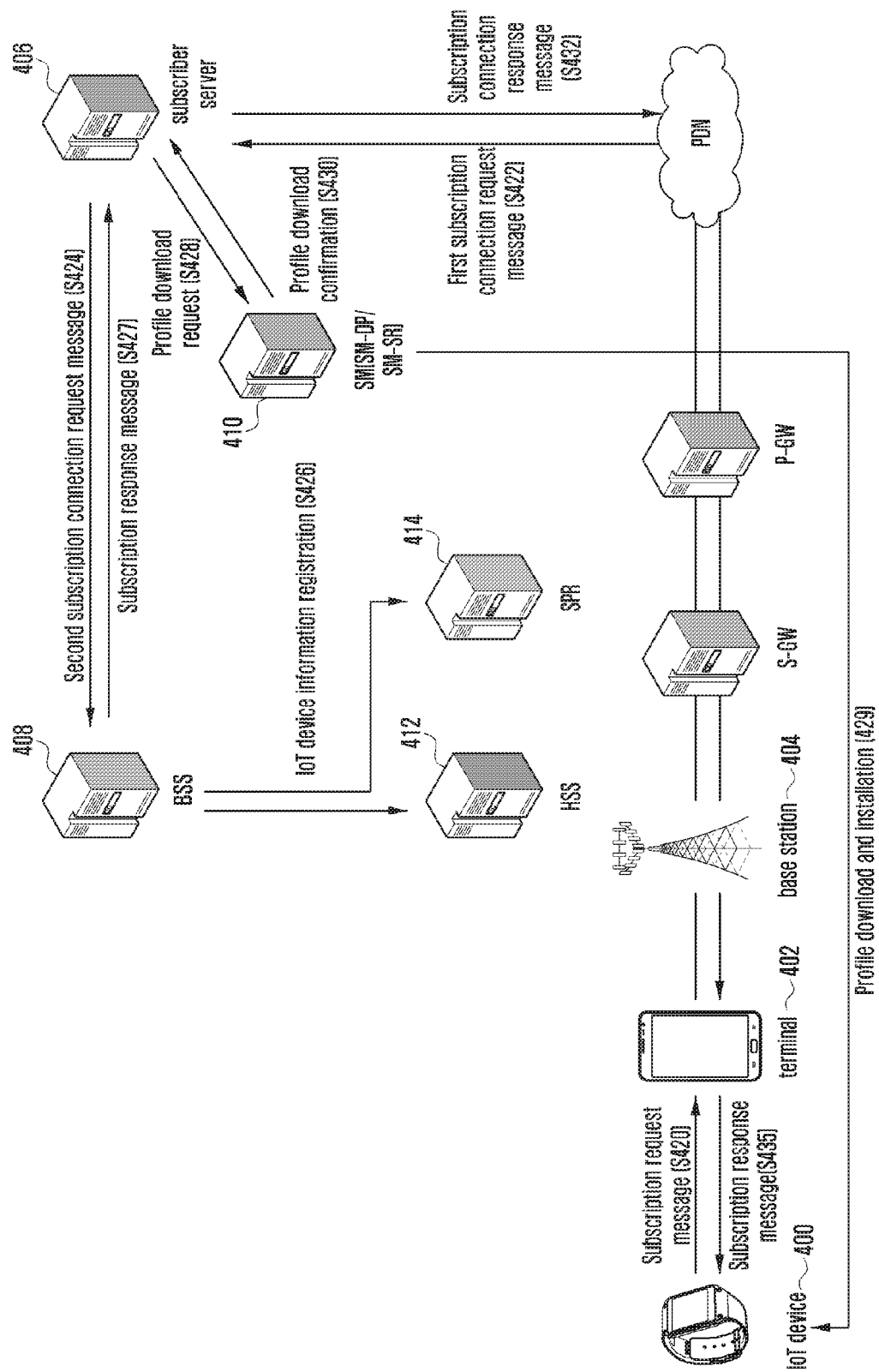
Figure 4B:
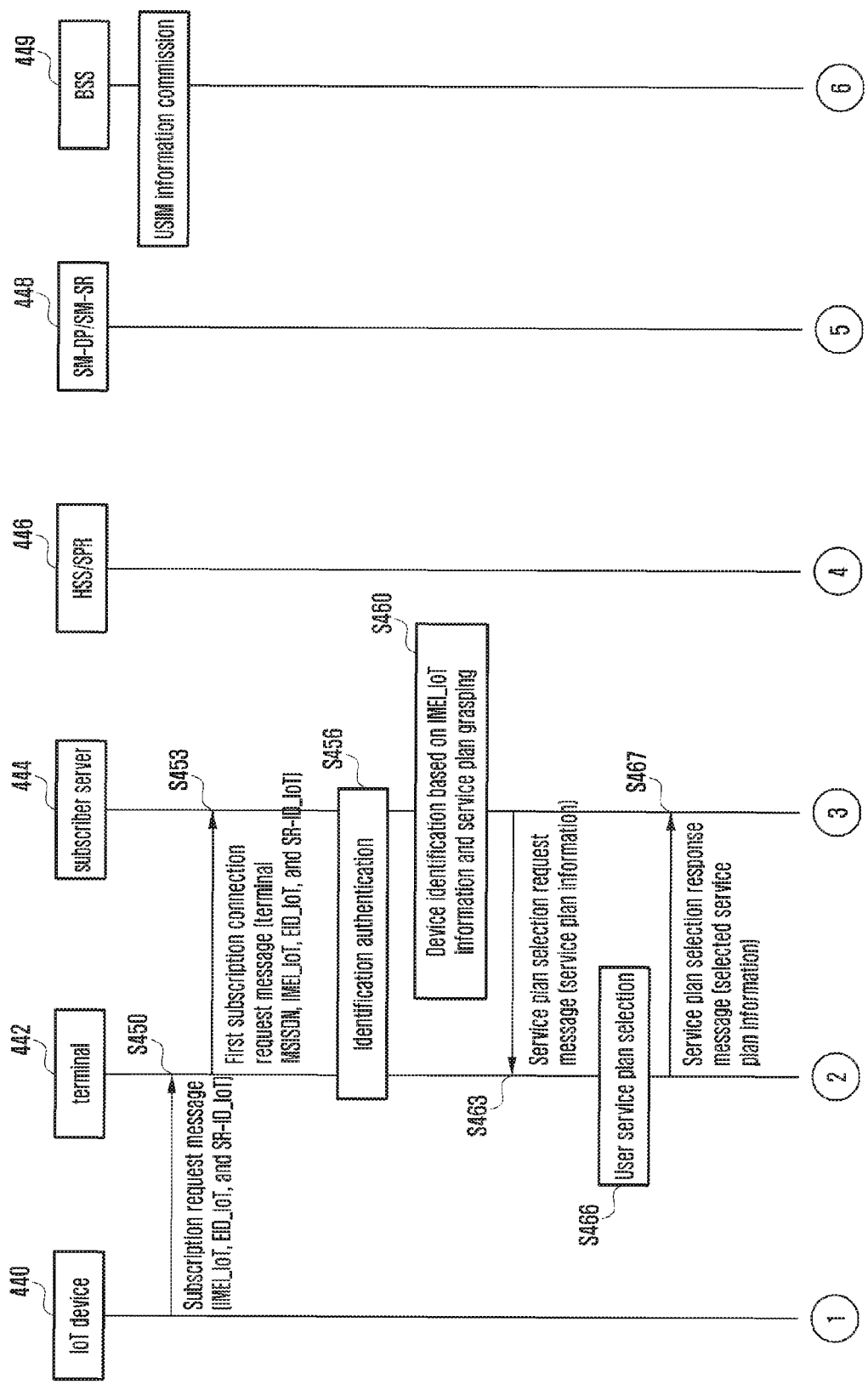

FIGS. 4A to 4C are diagrams explaining a method for subscribing an IoT device in a mobile communication system according to various embodiments of the present disclosure.

More specifically, FIG. 4A is a diagram explaining a method for subscribing an IoT device 400 having an embedded UICC (eUICC) in a mobile communication system, and FIGS. 4B and 4C are diagrams explaining in detail operations of respective nodes in FIG. 4A.

Accordingly, if eUICC is embedded in an IoT device, unlike a case where UICC is embedded, USIM information is not preregistered in the IoT device. Instead, eUICC information of the IoT device having the eUICC chip embedded therein is pre-stored in a subscriber management system (SM) 410. The subscription management system may include subscription manager-secure routing (SM-SR) that safely performs direct management of the eUICC information, and subscription manager-data preparation (SM-DP) that prepares so that the eUICC information can be safely provisioned.

At operation S420, the IoT device 400 may transmit a subscription request message to a terminal 402. The IoT device 400 may transmit the subscription request message using a short-range wireless communication method. Hereinafter, explanation will be made on the assumption that the IoT device 400 and the terminal 402 perform communication using NFC that is a kind of short-range wireless communication method. The IoT device 400 may transmit the subscription request message by approaching or contacting the terminal 402 using the NFC. The subscription request message may include eUICC information that is information required to subscribe the IoT device 400 having the embedded eUICC and terminal identification information. The eUICC information may include an end point identifier (EID) that is ID information of the eUICC chip embedded in the IoT terminal and SR-ID that is identification information of SM-SR that stores eUICC information. Further, the terminal identification information may include IMEI.

If the subscription request message is received from the IoT device 400, the terminal 402 may install a subscription application of the IoT device 400 on the basis of the information that is received through the NFC communication between the IoT device 400 and the terminal 402.

At operation S422, the terminal 402 that has received the subscription request message may transmit a first subscription connection request message to a subscriber server 406 through a mobile communication network. That is, the terminal 402 may transmit the first subscription connection request message to the subscriber server 406 through a base station 404, S-GW, P-GW, and a subsequent PDN network. The first subscription connection request message may include terminal identification information and eUICC information included in the subscription request message that the terminal 402 has received from the IoT device 400. The first subscription connection request message may further include subscription terminal information of the terminal 402. The subscription terminal information means information that is given to the subscribing terminal. The subscription terminal information may include, for example, an MSISDN. Further, the first subscription connection request message may include an ICCID that may be the identification information of the terminal 402.

If the first subscription connection request message is received, the subscriber server 406 may perform identity authentication through the terminal 402. The identity authentication means to authenticate that a subscriber of the mobile communication company for the terminal and the user who proceeds with the subscription of the IoT device are the same. In this case, the terminal 402 may support the identity authentication procedure using the installed subscription application. The identity authentication may be performed using the resident registration number for identifying the terminal user and other replacement methods.

Further, the subscriber server 406 may transmit service plan information that can be used in the corresponding IoT device 400 that is grasped through the IMEI of the IoT device 400 to the terminal 402. More specifically, the terminal 402 may receive the service plan information that can be used by the IoT device 400 from the subscriber server 406, and then may display the received service plan information on a screen. In this case, the terminal 402 may operate to select the service plan information using the installed subscription application. That is, the terminal may display the received service plan information using the installed subscription application, and may receive an input for selecting one of the received service plan information from the user. Thereafter, the terminal 402 may transmit the service plan information that is selected by the user to the subscriber server 406.

If the identity authentication through the terminal 402 has succeeded, at operation S424, the subscriber server 406 may connect the IoT device 400 and the terminal 402 to each other, and may transmit a second subscription connection request message to the BSS 408. In the same manner as the first subscription connection request message, the second subscription connection request message may include eUICC information included in the subscription request message that the terminal has received from the IoT device 400, terminal identification information, and subscription terminal information of the terminal 402. That is, the second subscription connection request message may include eUICC information embedded in the IoT device 400, IMEI of the IoT device 400, and MSISDN of the terminal 402. Further, the second subscription connection request message may include ICCID that may be the identification information of the terminal 402. Further, the second subscription connection request message may further include service plan information of the IoT device 400 which is selected by the user and which the subscriber server 406 receives from the terminal 402.

Further, the subscriber server 406 may transmit information indicating that the eUICC is embedded in the IoT device 400 to the BSS 408. That is, the subscriber server 406 may confirm whether the IoT device 400 has the embedded eUICC on the basis of the information that is included in the received second subscription connection request message, and may notify the BSS 408 of the result of confirmation. This is because the operation that the BSS 408 subscribes the IoT device 400 in the mobile communication company differs depending on whether the IoT device 400 has the embedded eUICC or the embedded UICC.

Further, if the identity authentication through the terminal 402 has succeeded, the subscriber server 406 may allocate connection ID information for the IoT device 400 and the terminal 402. The connection identification information may be used to perform changing of the service plan information of the IoT device 400, unsubscribing, and the like through the terminal 402. The change of the service plan information using the connection identification information and unsubscribing procedure will be described later with reference to FIGS. 5A and 5B and 6A and 6B.

If the second subscription connection request message is received, the BSS 408 may subscribe the IoT device 400 in the mobile communication company using the pre-subscribing information of the terminal 402 in the mobile communication company. More specifically, the BSS 408 may enquire the subscription information of the terminal 402 using the MSISDN value of the terminal 402 included in the received second subscription connection request message. Further, the BSS 408 may enquire the subscription information of the terminal 402 using the ICCID value of the terminal 402 that is included in the received second subscription connection request message. More specifically, the subscription information may include user's name, resident registration number, address, and email address that are user's personal information. Further, the subscription information may include information on a payment method of the terminal 402. Further, the BSS 408 may enquire the USIM information pre-registered (commissioned) in the BSS 408 using the ICCID value of the IoT device 400 that is included in the received second subscription connection request message. That is, the BSS 408 may enquire USIM information that is allocated to the IoT device 400 using the ICCID value that is information for discriminating the USIM card.

The BSS 408 may subscribe the IoT device 400 in the mobile communication company using the service plan information that is selected by the user and is included in the received second subscription connection request message, the terminal information that is obtained through the IMEI of the IoT device 400, previously enquired user information, and the USIM information of the IoT device 400. Thereafter, at operation S426, the BSS 408 may register (provision) information that includes the USIM information of the IoT device 400 in the HSS 412 and the SPR 414. More particularly, the BSS 408 may register IMSI and LTE K included in the USIM information of the IoT device in the HSS 412. Further, the BSS may further register QoS information for the IoT device 400 and information on an APN that is a service name to be used by the subscriber. The BSS 408 may register the IMSI included in the USIM information, information on a payment method, permitted service information, and permitted QoS information in the SPR 414.

If the BSS 408 subscribes the IoT device 400 in the mobile communication company, at operation S427, the BSS 408 may transmit a subscription response message that notifies of the subscription to the subscriber server 406. In this case, the BSS 408 may transmit the subscription response message, which includes the ICCID value of the IoT device 400 that is information capable of identifying the USIM to be installed in the determined IoT device 400 at operation S427, to the subscriber server 406. Thereafter, at operation S428, the subscriber server 406 may transmit a profile download request message to the SM 410 in order to download a profile corresponding to the USIM information into the IoT device 400. The profile download request message may include SR-ID_IoT, EID_IoT, and the received ICCID (ICCID_IoT) of the IoT device.

At operation S429, SM-DP included in the SM 410 may download the profile into the IoT device 400 in response to the profile download request message to install the downloaded profile. The SM 410 may download the profile into the eUICC chip of the IoT device 400 by Over the Air (OTA). The profile includes inherent data of a network service provider and key information. The IoT device 400 may connect to the mobile communication system using the profile to perform user authentication, and may be used as a storage space of user information. At operation S430, the SM may transmit a profile download confirmation message to the subscriber server 406.

In this case, at operation S432, the subscriber server 406 may transmit a subscription connection response message to the terminal 402 through a mobile communication network. The subscriber server 406 may transmit the subscription connection response message, which includes the connection identification information that is generated when the user is authenticated, to the terminal 402. The terminal 402, at operation S435, which has received the subscription connection response message, may display a message that notifies of the completion of the subscription on the screen. Further, the terminal 402 may transmit a subscription response message including the connection identification information that is received from the subscriber server 406 to the IoT device 400 to notify that the subscription has been completed. Selectively, if the subscription response message is received, the IoT device 400 may display a message that notifies the user that the IoT device has subscribed to the mobile communication company.

Referring to FIG. 4B, respective node operations of an IoT device 440, a terminal 442, a subscriber server 444, an HSS and SPR 446, an SM-DP and SM-SR 448, and a BSS 449, to subscribe the IoT device in a mobile communication company will be described.

USIM information may be pre-registered (commissioned) in the BSS 449. At operation S450, the IoT device 440 may transmit a subscription request message to the terminal 442. The subscription request message may include IMEI_IoT (IMEI) of the IoT device 440, EID_IoT, and SR-ID_IoT (SR-DI). At operation S453, the terminal 442 may transmit a first subscription connection request message to the subscriber server 444. The first subscription connection request message may further include MSISDN of the terminal in addition to information that is included in the subscription request message. That is, the first subscription connection request message may include MSISDN of the terminal, IMEI_IoT, EID_IoT, and SR-ID_IoT. Further, the first subscription connection request message may include ICCID that is identification information of the terminal 442. At operation S456, the terminal 442 and the subscriber server 444 may perform identity authentication. The identity authentication of the terminal 402 means to authenticate that a subscriber of the mobile communication company for the terminal and the user who proceeds with the subscription of the IoT device are the same.

At operation S460, the subscriber server 444 may identify the kind of the IoT device 440 that has requested the subscription on the basis of the IMEI_IoT information, and may grasp at least one service plan that can be used by IoT device. At operation S463, the subscriber server 444 may transmit a service plan selection request message to the terminal 442. The service plan selection request message may include information on the service plan which can be used by the IoT device and which is grasped by the subscriber server 444.

At operation S466, the terminal 442 may select a user service plan. More particularly, the terminal may display information on at least one determined usable service plan, which is included in the received service plan selection request message, on the screen. Through reception of a user's input for selecting one of the at least one service plan displayed on the screen, the terminal 442 may select the user service plan. Thereafter, at operation S467, the terminal 442 may transmit a service plan selection response message to the subscriber server 444.

If the identity authentication of the terminal 442 has succeeded, at operation S468, the subscriber server 444 may register the subscription connection and may generate connection identification information of the IoT device 440 and the terminal 442. Further, the subscriber server may transfer a registration call. Thereafter, the subscriber server 444 may transmit a second subscription connection request message to the BSS 449, at operation S470. The second subscription connection request message may include all pieces of information included in the first subscription connection request message. Further, the second subscription connection request message may additionally include the selected service plan information. Further, the second subscription connection request message may include the ICCID that is the identification information of the terminal 402. That is, the second subscription connection request message may include terminal MSISDN, terminal ICCID, IMEI_IoT, EID_IoT, SR-ID_IoT, and selected service plan information.

At operation S473, the BSS 449 may subscribe the IoT device 440 in the mobile communication company using the subscription information of the terminal 442. More specifically, the BSS may acquire the subscription information of the IoT device 440 using the subscription information of the terminal 342 that is enquired using at least one of the MSISDN and ICCID values of the terminal 442. Further, at operation S476, the BSS 449 may register (provision) the USIM information to be downloaded into the IoT device 440 in the HSS and SPR 446.

Thereafter, at operation S480, the BSS 449 may transmit a subscription response message notifying that the IoT device has subscribed to the mobile communication company to the subscriber server 444. The subscription response message may include ICCID for identifying the USIM information to be downloaded. The profile download request message may include SR-ID_IoT, EID_IoT, and the received ICCID_IoT (ICCID) of the IoT device.

At operation S483, the subscriber server 444 may transmit a profile download request message to the SM-DP and SM-SR 448 in order to download the profile corresponding to the USIM information into the IoT device 440 on the basis of the ICCID included in the received subscription response message. The profile download request message may include SR-ID_IoT, EID_IoT, and the received ICCID_IoT (ICCID) of the IoT device.

At operation S486, SM-DP included in the SM-DP and SM-SR 448 may download the profile into the IoT device 440 in response to the profile download request message to install the downloaded profile. At operation S490, the SM-DP and SM-SR 448 may transmit a profile download confirmation message to the subscriber server 444.

At operation S493, the subscriber server 444 may transmit a subscription connection response message to the terminal 442. The subscription connection response message may include the connection identification information generated by the subscriber server 444 at operation S468. At operation S496, the terminal may transmit the subscription response message to the IoT device 440. The subscription response message may be a message for notifying the IoT device 440 that the IoT device has subscribed to the mobile communication company, and may include the subscription information of the IoT device.

Figure 5A:
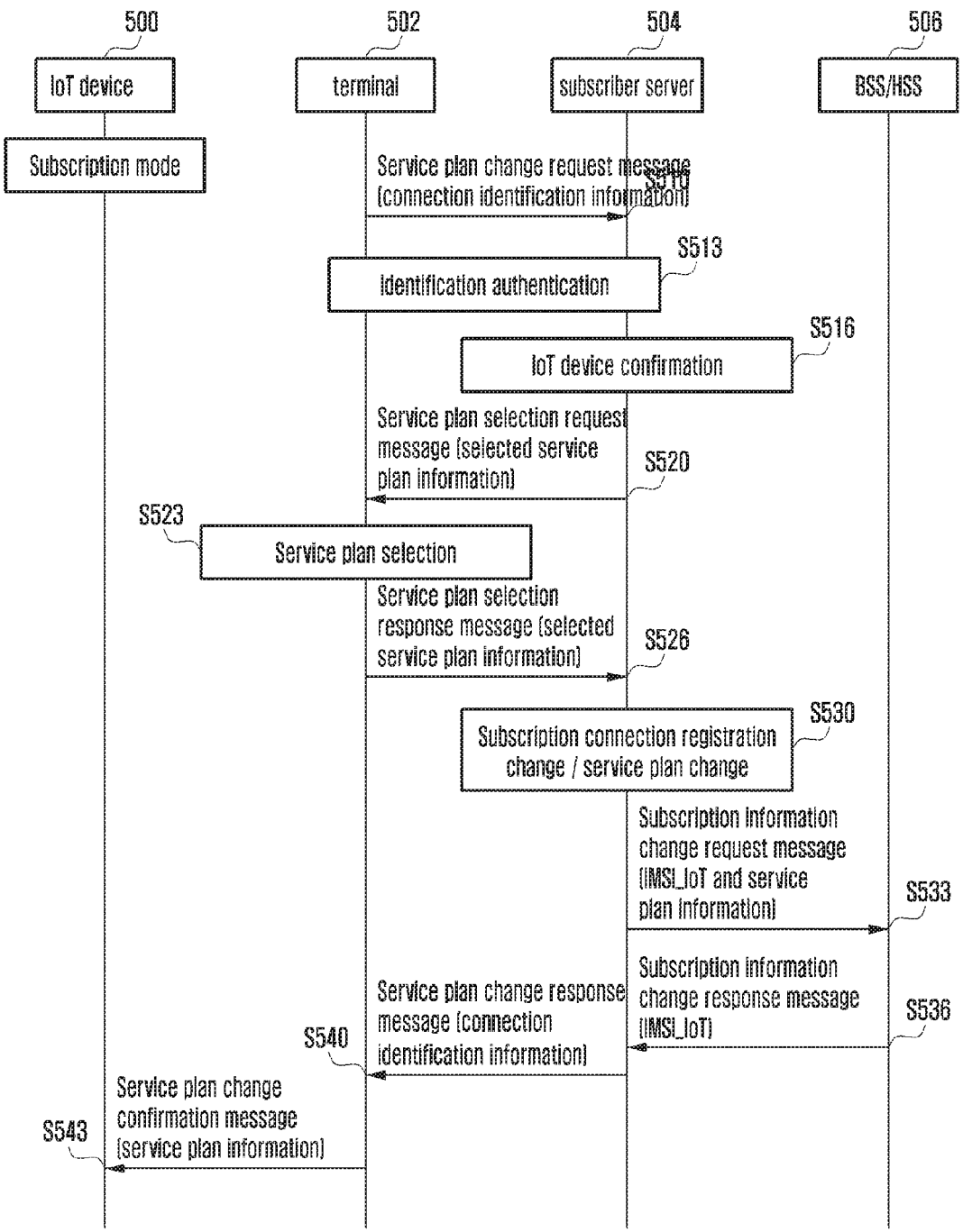
FIGS. 5A and 5B are diagrams explaining a method for changing a service plan of an IoT device connected to a terminal using the terminal in a mobile communication system according to various embodiments of the present disclosure.
Figure 5B:
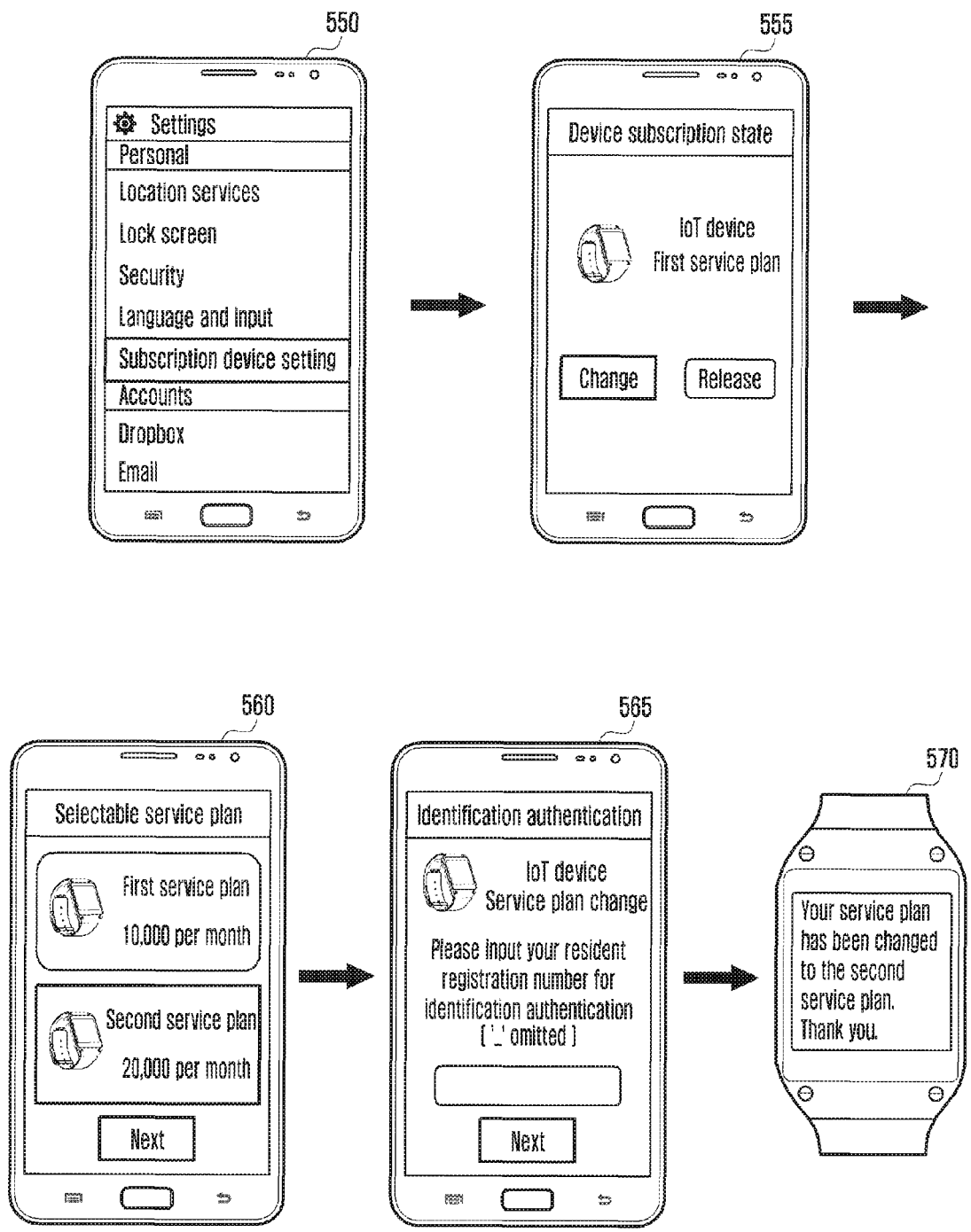

FIGS. 5A and 5B are diagrams explaining a method for changing a service plan of an IoT device connected to a terminal using the terminal in a mobile communication system according to various embodiments of the present disclosure.

Referring to FIG. 5A, respective node operations of an IoT device 500, a terminal 502, a subscriber server 504, and a BSS and HSS 506, to change a service plan of the IoT device will be described. Hereinafter, explanation will be made on the assumption that the terminal 502 has an embedded UICC. However, it will be apparent to those of ordinary skill in the art to which the present disclosure pertains to make design modifications so as to apply the above-described embodiment in which the terminal 502 has the embedded UICC to a case where the terminal 502 has an embedded eUICC according to another embodiment of the present disclosure.

Explanation will be made on the assumption that the IoT device 500 has subscribed to the mobile communication system through the above-described procedure. At operation S510, the terminal 502 may transmit a service plan change request message for the IoT device 500 to the subscriber server 504. The service plan change request message may include connection identification information that is generated by the subscriber server 504 with respect to the IoT device 500 and the terminal 502 in the subscription procedure. If the service plan change request message for the IoT device 500 is received, at operation S513, the subscriber server 504 may perform identification authentication with respect to the terminal 502. In the same manner as the subscription procedure, the identification authentication means to authenticate that a subscriber of the mobile communication company for the terminal and a user who proceeds with the service plan change procedure of the connected IoT device are the same.

If the identification authentication has succeeded, at operation S516, the subscriber server 504 may confirm the IoT device 500. Thereafter, at operation S520, the subscriber server 504 may transmit a service plan selection request message for the confirmed IoT device 500 to the terminal 502. More specifically, if the IoT device 500 is confirmed, the subscriber server 504 may grasp at least one service plan that can be used by the IoT device 500 on the basis of the subscription information of the IoT device 500. The service plan selection request message may include information on the service plan which can be used by the IoT device and is grasped by the subscriber server 504.

At operation S523, the terminal 502 may select the user service plan. More specifically, the terminal may display information on at least one determined usable service plan, which is included in the received service plan selection request message, on the screen. Through reception of a user's input for selecting one of the at least one service plan displayed on the screen, the terminal 502 may select the user service plan. Thereafter, at operation S526, the terminal 502 may transmit a service plan selection response message to the subscriber server 504.

Thereafter, if the service plan selection response message is received, at operation S530, the subscriber server 504 may change a subscription connection registration, and may change service plan information that is included in the subscription information of the IoT device 500. That is, the subscriber server 504 may change the service plan information of the IoT device 500 using the selected service plan information that is included in the service plan selection response message. At operation S533, the subscriber server 504 may transmit a subscription information change request message for requesting the change of the subscription information of the IoT device 500 to the BSS and HSS 506. In this case, the subscription information change request message may include IMSI information included in the USIM information and the selected service plan information.

The BSS and HSS 506 may change the registered service plan information of the IoT device 500 in response to the subscription information change request message, and may transmit a subscription information change response message for confirmation of the changed service plan information to the subscriber server 504 at operation S536. At operation S540, the subscriber server 504 may transmit the service plan change response message. In this case, the service plan change response message may include the connection identification information to be transmitted. Further, at operation S543, the terminal 502 may transmit a service plan change confirmation message for notification of the service plan change to the IoT device 500.

FIG. 5B is a diagram exemplarily illustrating a display screen in a terminal that supports changing of a service plan of an IoT device.

That is, a user may change the service plan of the IoT device using the IoT device and a subscribing terminal instead of the IoT device having a small screen that is inconvenient in operation. In this case, in order to identify the IoT device and the subscribing terminal, the subscriber server generates the connection identification information in the process of performing the subscription procedure as described above.

As illustrated, a setting menu 550 that is displayed on the terminal may include a "subscribing device setting" menu. The subscribing device setting menu may be a menu for setting an electronic device including the IoT device connected to the terminal. In the case of selecting the subscribing device setting menu, the terminal may display a device subscription state screen 555. The user can change or control various settings of the electronic device connected to the terminal that has subscribed to a mobile communication company using the subscribing device setting menu. The terminal may display information of the IoT device in the device subscription state. The IoT device informatinon may include the kind of the IoT device and currently used service plan information. The user can change the service plan of the IoT device through selection of a change button displayed on screen 555.

If the user selects the change button on screen 555, the terminal may display service plan information that can be selected by the IoT device at screen 560. The selectable service plan information may be determined by the subscriber server using the terminal identification information of the IoT device that is transmitted by the terminal, for example, IMEI, to be transmitted to the terminal. The user may select one of the displayed selectable at least one piece of service plan information. If the user selects the service plan, the terminal may display a screen for performing identification authentication at screen 565. The identity authentication means to authenticate that the subscriber of the mobile communication company for the terminal and the user who proceeds with changing of the service plan of the IoT device are the same. If the user has completed the identification authentication, the service plan information is changed, and thereafter, the IoT device that has received a service plan information change confirmation message may display a message for confirming the service plan change as displayed on the screen of the IoT device 570.

Figure 6A:
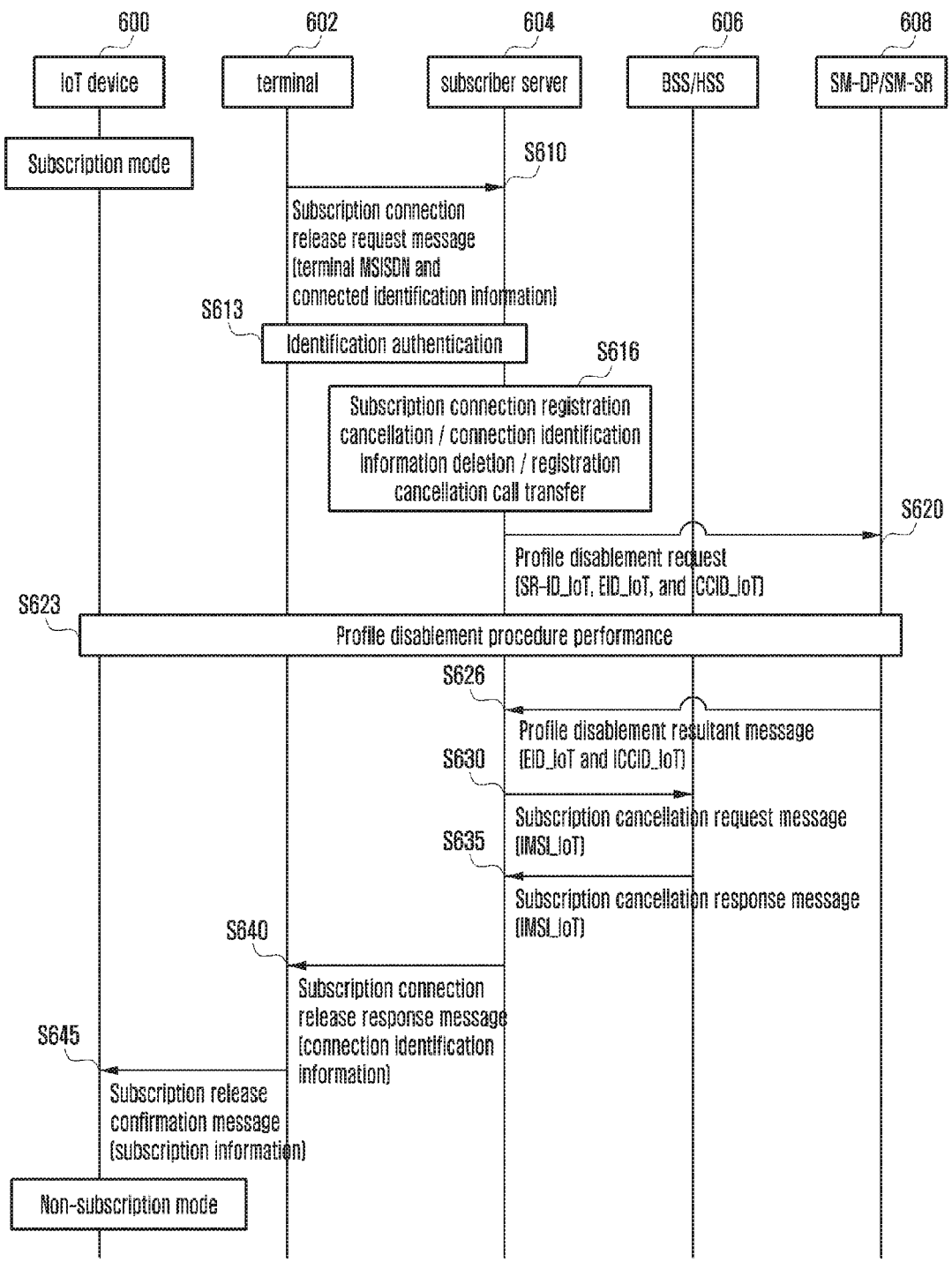
FIGS. 6A and 6B are diagrams explaining a method for unsubscribing an IoT device connected to a terminal using the terminal in a mobile communication system according to various embodiments of the present disclosure.
Figure 6B:
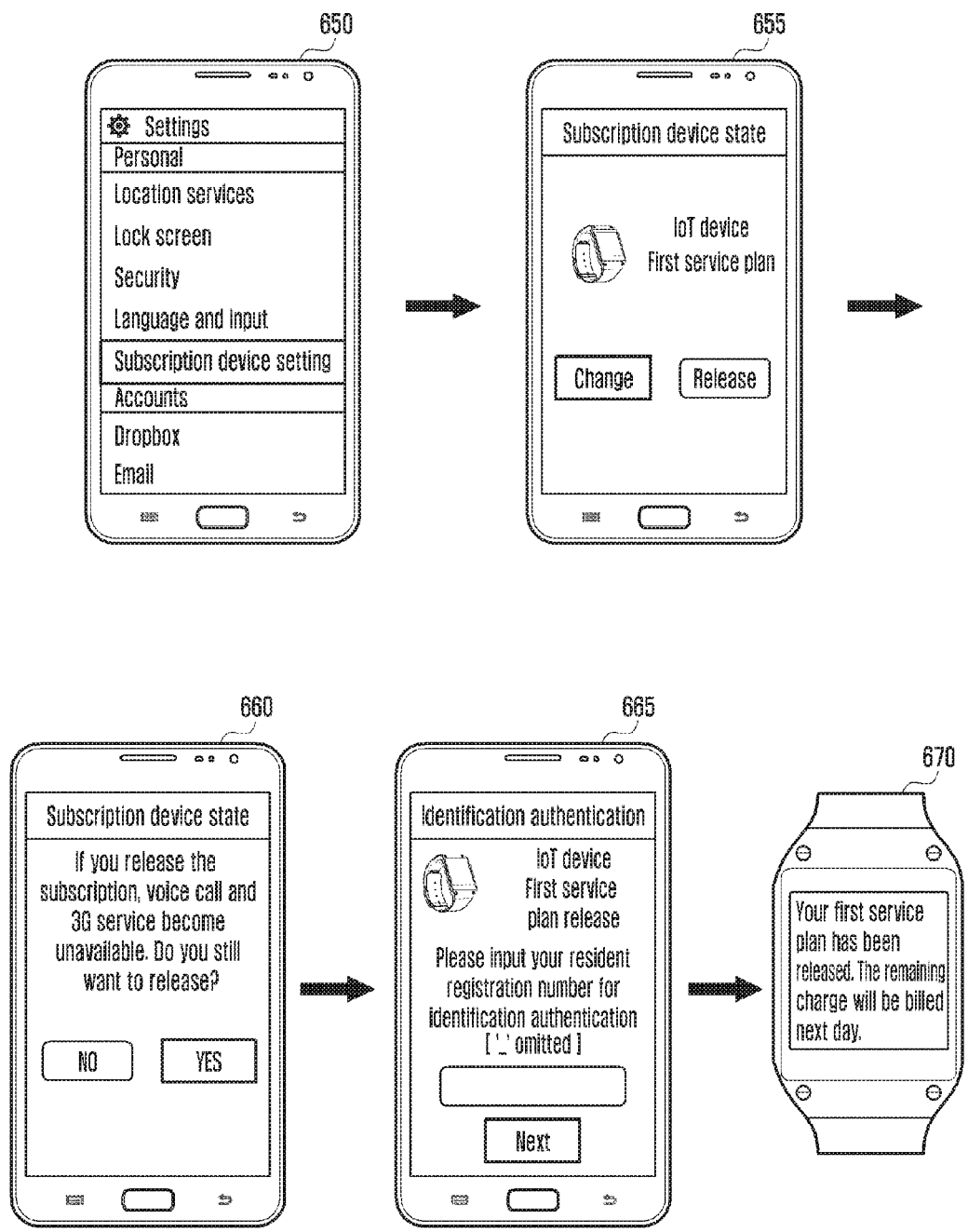

FIGS. 6A and 6B are diagrams explaining a method for unsubscribing an IoT device connected to a terminal using the terminal in a mobile communication system according to various embodiments of the present disclosure.

Referring to FIG. 6A, respective node operations of an IoT device 600, a terminal 602, a subscriber server 604, a BSS and HSS 606, and SM-DP and SM-SR 608 to release subscription of the IoT device will be described. Hereinafter, explanation will be made on the assumption that the terminal 602 has an embedded UICC. However, it will be apparent to those of ordinary skill in the art to which the present disclosure pertains to make design modifications so as to apply the above-described embodiment in which the terminal 602 has the embedded UICC to a case where the terminal 602 has an embedded eUICC according to another embodiment of the present disclosure.

Explanation will be made on the assumption that the IoT device 600 has subscribed to the mobile communication system through the above-described procedure. At operation S610, the terminal 602 may transmit a subscription connection release request message of the subscribing IoT device 600 to the subscriber server 604. The subscriber connection release request message may include connection identification information that is generated by the subscriber server 604 with respect to the IoT device 600 and the terminal 602 in the subscription procedure. If the subscription connection release request message for the terminal 620 is received, at operation S613, the subscriber server 604 may perform identification authentication with respect to the terminal 602. If the identification authentication has succeeded, at operation S616, the subscriber server 604 may cancel the subscription connection registration of the IoT device 600, delete the connection identification information from the server, and transfer a call for registration cancellation. Thereafter, at operation S620, the subscriber server 604 may transmit a profile disablement request message to the SM-DP and SM-SR 608. The profile disablement request message may include EID_IoT, SR-ID_IoT, and ICCID information in the same manner as the above-described profile download request message.

At operation S623, the SM-DP and SM-SR 608 that has received the profile disablement request message disables the profile that is downloaded into the IoT device 600. Thereafter, at operation S626, the SM-DP and SM-SR 608 may transmit a profile disablement resultant message to the subscriber server 604. If the disablement of the profile that is downloaded into the IoT device 600 is recognized, at operation S630, the subscriber server 640 may transmit a subscription cancellation request message to the BSS and HSS 606. The subscription cancellation request message may include an IMSI value among the USIM information installed in the IoT device. The BSS and HSS 606 may cancel the subscription of the IoT device 600 through deletion of information of the IoT device 600 including the registered USIM information of the IoT device 600 in response to the subscription cancellation request message. Thereafter, at operation S635, the BSS and HSS 606 may transmit a subscription cancellation response message to the subscriber server 604 for notification of the subscription of the IoT device. The subscription cancellation response message may include an IMSI value of the IoT device 600.

If the subscription cancellation response message is received, the subscriber server 604 may transmit a subscription connection release response message to the terminal 602 to notify the terminal 602 of the release of the subscription connection. In this case, the connection identification information that is deleted at operation 616 may be included in the subscription connection release response message to be transmitted to the terminal 602. Even if the connection identification is deleted at operation S616, the subscriber server 640 may temporarily store the connection identification information for the terminal 602 and the IoT device until the whole subscription connection release process is completed. That is, when the terminal 602 transmits the subscription connection release request message at operation S610, and when the terminal 602 transmits the subscription connection release response message at operation S640 after the subscriber server 604 releases the subscription connection in response to this, the messages may include the connection identification information for identifying connection between the IoT device 600 and the terminal 602. This is because the IoT device 600 is the target of the subscription connection release request message transmitted by the terminal 602 and the subscription connection release response message transmitted b the subscriber server 604.

Thereafter, at operation S645, the terminal 602 that has received the subscription connection release response message for the IoT device 600 may transmit a subscription release confirmation message to the IoT device 600 using the connection identification information. In this case, the subscription release confirmation message may include the subscription information of the IoT device 600 at the time of subscription release. Thereafter, the subscription of the IoT device 600 is released to be in a non-subscription mode.

FIG. 6B is a diagram exemplarily illustrating a display screen in a terminal that supports releasing of a service plan of an IoT device.

That is, a user may perform releasing procedure of the IoT device using a subscribing terminal that is connected to the IoT device through connection identification information instead of the IoT device having a small screen that is inconvenient in operation. In FIG. 6B, a setting menu 650 for the terminal and subscribing device state screen 655 that are displayed are the same as those illustrated in FIG. 5B. The user may release the IoT device through selection of a release button displayed on screen 655.

Thereafter, the terminal may display a message for confirming whether to release the IoT device on screen 660. If the user selects to release the IoT device, identification authentication for the terminal may be performed as illustrated at screen 665 of FIG. 6B. If the identification authentication has succeeded, the IoT device is released from a mobile communication system. That is, the service plan for the service to the subscribing IoT device is released, and the IoT device that has received the subscription release confirmation message may display a message for confirming that the service plan has been released as illustrated at screen of IoT device 670 of FIG. 6B.

On the other hand, the terminal can perform Bluetooth pairing using NFC without the necessity of a manual app installation and complicated setting. That is, in the case where the user does not desire to separately subscribe the IoT device to a mobile communication company, the user may use the service through the service plan to which the terminal has subscribed. Selectively, the terminal may pass through the user authentication process after pairing through Bluetooth, and may receive a service plan selection input from the user. In this case, the terminal may separately subscribe the IoT device to the mobile communication company through the above-described process.

Figure 7:
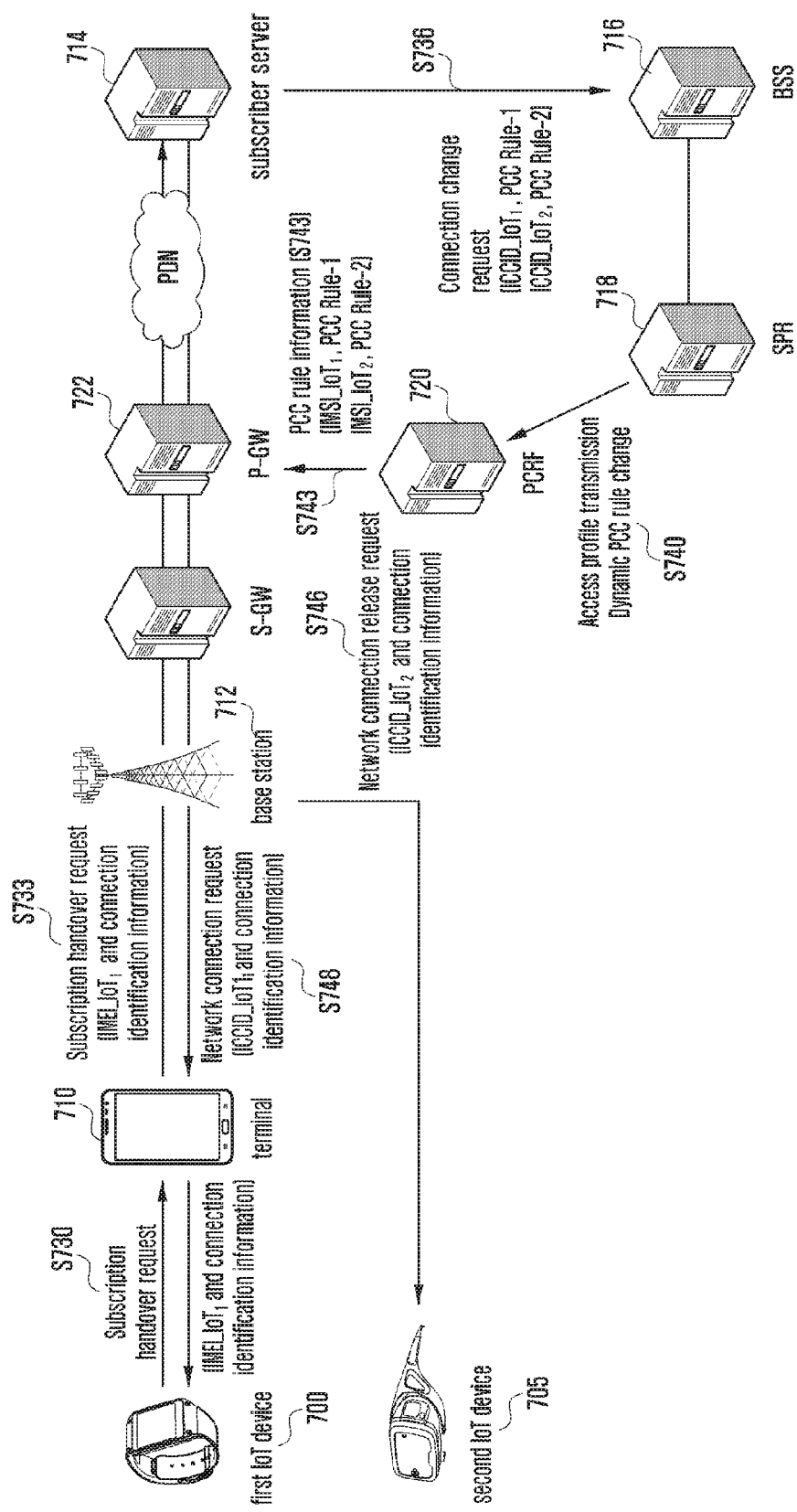
FIG. 7 is a diagram explaining a subscription handover method between a plurality of IoT devices in a mobile communication system according to an embodiment of the present disclosure.

FIG. 7 is a diagram explaining a subscription handover method between a plurality of IoT devices in a mobile communication system according to an embodiment of the present disclosure.

Referring to FIG. 7, a subscription handover method for a subscription service plan between a first IoT device 700 and a second IoT device 705 connected to a pre-subscribing terminal 710, is explained. In the case where a plurality of IoT devices are connected to the terminal 710, the terminal 710 may manage information on the connected IoT devices 700 and 705, as shown in Table 1 below.

| Terminal | |
|---|---|
| IMEI: IMEI_1 | |
| ICCID: ICCID_1 | |
| Pairing ID: 2777777 | Pairing ID: 299999999 |
| First IoT Device | Second IoT Device |
| IMEI_IoT1 | IMEI_IoT2 |
| ICCID_IoT1 | ICCID_IoT2 |
| Non-Connected | Connected |

The subscription handover may mean that a first IoT device 700 connects to the mobile communication system to use a service plan that has been used by the second IoT device 705 while the second IoT device 705 connects to the mobile communication system to receive a service, and the second IoT device 705 releases the connection. In this case, the first IoT device 700 may request the handover through the terminal 710, or may directly request the handover without passing through the terminal 710.

First, a process in which the first IoT device 700 performs subscription handover through the connected terminal 710 will be described. At operation S730, the first IoT device 700 may transmit a subscription handover request message to the terminal 710. The subscription handover request message may include IMEI_IoT$_1$ that may be terminal identification information of the first IoT device 700 and connection identification information between the terminal and the first IoT device 700. The terminal 710 may determine that the subscription handover request message is transmitted from the first IoT device using the received IMEI_IoT$_1$ and connection identification information. Further, the terminal may authenticate the first IoT device using the IMEI_IoT$_1$ and the connection identification information.

At operation S733, the terminal transmits the subscription handover request message to a base station 712. The subscription handover request message may include all pieces of information included in the subscription handover request message that is received by the terminal 710. The base station 712 transfers the subscription handover request message to a subscriber server 714 through a mobile communication network. At operation S736, the subscriber server 714 transmits a connection change request message to BSS 716, at operation S736. The connection change request message may include ICCID (ICCID_IoT$_1$) and PCC Rule (PCC-Rule_1) of the first IoT device 700 and ICCID (ICCID_IoT$_2$) and PCC Rule (PCC-Rule_2) of the second IoT device 705.

More specifically, the PCC rule PCC-Rule_1 for the first IoT device 700 and the PCC rule PCC-Rule_2 for the second IoT device 705 may include information on the service plan to be changed with respect to the first IoT device and the second IoT device.

The BSS 716 transfers the connection change request message to SPR 718, and thereafter, the SPR 718 transmits an access profile to PCRF 720 at operation S740. Through transmission of the access profile, the PCC rule can be dynamically changed. Thereafter, at operation S743, the PCRF 720 transmits information on the PCC rule to P-GW 722. The P-GW 722 may transmit a response message to the subscription handover request between the connected IoT devices to the base station 712 on the basis of information on the transmitted PCC rule. At operation S746, the base station 712 that has received the message may transmit a PCC network connection release request message to the second IoT device that is pre-connected to the network.

Further, at operation S748, the base station 712 may transmit a network connection request message to the first IoT device 700 that has requested the subscription handover simultaneously or thereafter. Further, each of the connection release request message and the connection request message may include ICCID of each IoT device and connection identification information.

On the other hand, in the case where the first IoT device 700 requests a subscription handover to use the service plan to which another IoT device has subscribed as described above with reference to FIG. 7, the first IoT device 700 may directly transmit the subscription handover request message without passing through the connected terminal 710. That is, the first IoT device 700 may request the subscription handover request by connecting to the mobile communication network through a limited access. At this time, in the case of directly receiving the subscription handover request from the first IoT device 700, the P-GW 722 of the mobile communication network can change an access policy with respect to the IoT devices connected to the terminal. That is, previously, unlimited access policy has been applied to the second IoT device 705 that is connected, and limited access policy has been applied to the first IoT device 700 that is not connected. However, in the case of receiving the subscription handover request and passing through the authentication process, unlimited access policy can be applied to the first IoT device 700, and limited access policy can be applied to the second IoT device 705.

As described above with reference to FIG. 7, the user can make subscription handover with respect to at least two IoT devices using the service plan for the IoT device. In the case where two or more IoT devices, which are connected to the same terminal, have subscribed to the mobile communication system, the two or more IoT devices can receive the service from the mobile communication system using one service plan. Through this, the user can changeably use the IoT devices according to circumstances even without the necessity of subscribing to service plans the number of which corresponds to the number of IoT devices that the user possesses.

Figure 8:
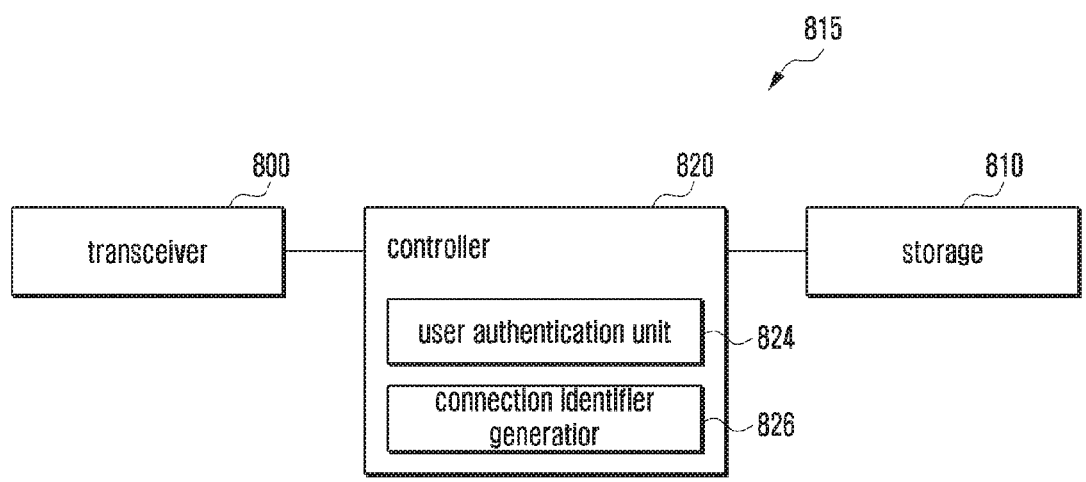
FIG. 8 is a block diagram illustrating the internal configuration of a subscriber server according to an embodiment of the present disclosure.

FIG. 8 is a block diagram illustrating the internal configuration of a subscriber server 815 according to an embodiment of the present disclosure.

More specifically, the subscriber server may include a transceiver 800, a storage 810, and a controller 820 as illustrated in FIG. 8.

The transceiver 800 transmits/receives information that is required for the subscriber server to operate. First, the transceiver 800 may receive a subscription connection request message of an IoT device from a terminal through a mobile communication network. In this case, the transceiver may receive subscription identification information that is required for the controller to perform user authentication of the terminal and identification information of the IoT device. Further, the IoT device may receive at least one piece of usable service plan information from the controller 820 to transmit the received information to the terminal. Further, the transceiver 800 may receive one of the at least one pieces of service plan information that is selected by the user.

Further, the transceiver 800 may transmit a subscription connection request message to a BSS. Further, the transceiver may receive a subscription response message for notifying the BSS that the IoT device has subscribed in response to the subscription connection request message from the BSS. Further, the transceiver may receive connection identification information between the IoT device and the terminal from the controller 820 and may transmit the received connection identification information to the terminal. Further, the transceiver 800 may receive a service plan change request message and a subscription connection release request message from the terminal.

Further, if the controller 820 changes the service plan after receiving the service plan change request message, the transceiver 800 may transmit a subscription information change request message to the BSS. Further, the transceiver 800 may receive a response message to the subscription information change request message from the BSS. Further, if the subscription connection release request message is received from the terminal, the transceiver 800 may transmit a disablement request message of a profile that is downloaded into eUICC of the terminal to an SM. After receiving a profile disablement resultant message from the SM, the transceiver 800 may transmit a subscription cancellation request message to the HSS. Further, the transceiver 800 may receive a subscription handover request message from one of two or more IoT devices that is in a non-contact state.

The storage 810 may store information that is required for the subscriber server 815 to operate according to the present disclosure. The subscriber server 815 may store connection identification information generated with respect to the IoT device and the terminal. Further, the storage 810 may store information on the state of the IoT device connected to the terminal. Further, the storage 810 may store service plan information that is usable in accordance with the terminal or the IoT device.

The controller 820 may additionally include a user authentication unit 824 and a connection identifier generator 826. The user authentication unit 824 may authenticate the user of the terminal on the basis of the subscription terminal information that is received from the terminal. The authentication of the terminal user includes identification authentication of the terminal, and means to authenticate that a subscriber of a mobile communication company for the terminal and a user who proceeds with the subscription of the IoT device are the same.

Further, the connection identifier generator 826 may generate a connection identifier that is allocated to the IoT device that is connected to the pre-subscribing terminal. That is, in the case of subscribing the IoT device to the mobile communication company using the pre-subscribing terminal, the connection identifier generator 826 may generate and allocate the connection identifier between the pre-subscribing terminal and the IoT device. The connection identifier may be called connection identification information, and in the present disclosure, the connection identifier and connection identification information may be mixedly used. The connection identification information may be used to perform procedures of IoT device service plan information change and subscription release through the terminal.

The controller 820 may perform all the operations of the user authentication unit 824 and the connection identifier generator 826.

Further, the controller 820 receives a first subscription connection request message of the electronic device from the pre-subscribing terminal, and the first subscription connection request message includes subscription terminal information of the terminal and identification information of the electronic device. The controller 820 authenticates the user of the terminal on the basis of the subscription terminal information included in the received first subscription connection request message, and if the user authentication has succeeded, the controller 820 operates to transmit a second subscription connection request message of the electronic device to a support server. The subscription terminal information of the pre-subscribing terminal is used to acquire the subscription information of the electronic device to subscribe the electronic device thereto. Further, if the user authentication has succeeded, the controller 820 operates to generate the connection identification information.

Further, the controller 820 may operate to receive a charge change request message of the electronic device that includes the connection identification information from the terminal and to authenticate the user of the terminal on the basis of the connection identification information. If the user authentication has succeeded, the controller 820 may operate to change the subscription information of the electronic device and to request the service plan change from the support server on the basis of the subscription information of the electronic device.

Further, the controller 820 may operate to receive a subscriber handover request message including the connection identification information from the terminal and to transmit a connection change request message to the support server on the basis of the received subscriber handover request message.

Figure 9:
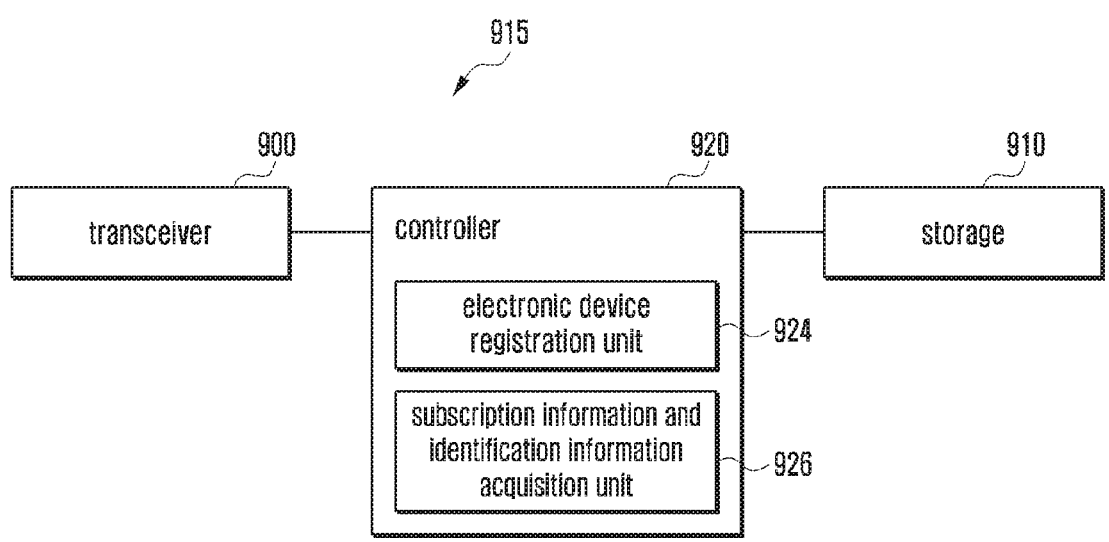
FIG. 9 is a block diagram illustrating the internal configuration of a support server according to an embodiment of the present disclosure.

FIG. 9 is a block diagram illustrating the internal configuration of a support server 915 according to an embodiment of the present disclosure.

More specifically, according to the present disclosure, the support server 915 means a BSS, and may include a transceiver 900, a storage 910, and a controller 920. Further, the controller 920 may further include an electronic device registration unit 924 and a subscription information and identification information acquisition unit 926.

The transceiver 900 transmits/receives information that is required for the support server 915 to operate. The transceiver 900 may receive a subscription connection request message from a subscriber server. The subscriber connection request message may include subscription terminal information of a terminal and identification information of an IoT device. Further, the transceiver 900 may transmit the identification information and subscription information of the IoT device to register information on the IoT device in HSS and SPR. Further, if the subscription procedure is completed, the transceiver 900 may transmit a subscription response message to the subscriber server. Further, the transceiver 900 may receive a subscription information change request message from the subscriber server.

The storage 910 may pre-store plural pieces of USIM information. Further, the storage 910 may store subscription information of a subscriber. The subscription information may include personal information including name, resident registration number, home address, and email, and a service plan, that is, service plan information.

The controller may additionally include the electronic device registration unit 924 and the subscription information and identification information acquisition unit 926. The electronic device registration unit 924 may register information on the IoT device registered for the terminal in the HSS and SPR. Further, the subscription information and identification information acquisition unit 926 may acquire the subscription information using the subscription terminal information of the terminal, and may acquire the USIM information using the identification information of the IoT device. Further, the controller 920 may perform all the operations of the electronic device registration unit 924 and the subscription information and identification information acquisition unit 926.

Further, the controller 920 may operate to receive a subscription connection request message of the electronic device, which has made a connection request to the pre-subscribing terminal, from the subscriber server, to acquire subscription information of the electronic device on the basis of subscription terminal information of the terminal included in the received subscription connection request message, and to subscribe the electronic device on the basis of the subscription information of the electronic device and the identification information of the electronic device included in the subscription connection request message. The subscription connection request message of the electronic device is received if the subscriber server authenticates the user of the terminal.

Further, the controller 920 may further operate to register the identification information of the electronic device in the HSS and the SPR.

Figure 10:
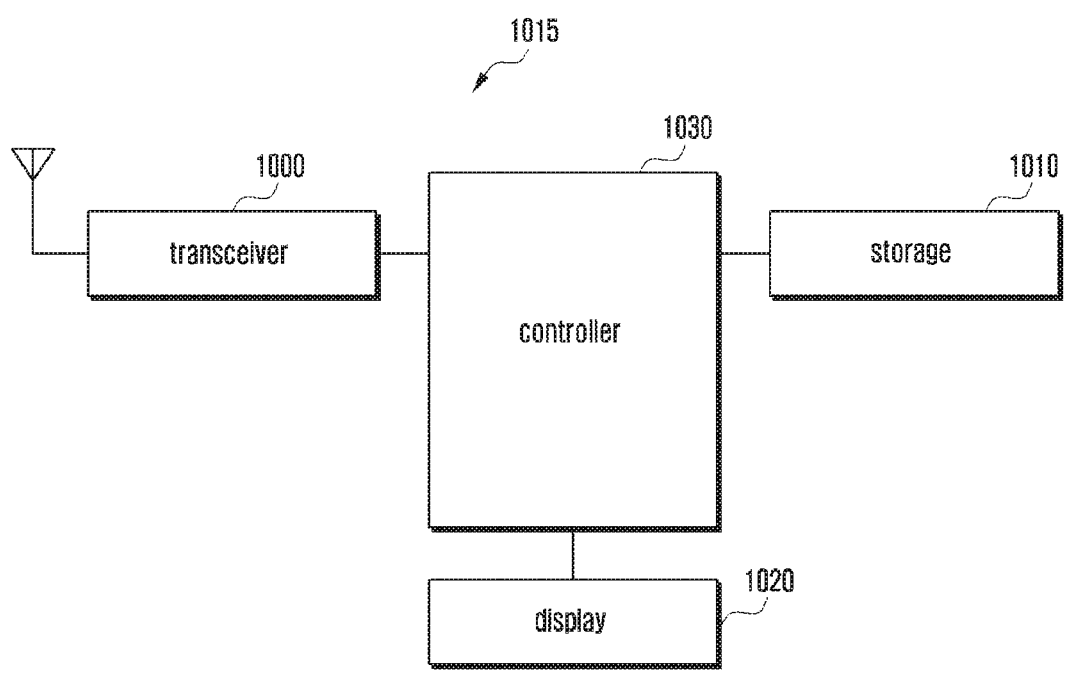
FIG. 10 is a block diagram illustrating the internal configuration of a terminal according to an embodiment of the present disclosure.

FIG. 10 is a block diagram illustrating the internal configuration of a terminal 1015 according to an embodiment of the present disclosure.

Referring to FIG. 10, the terminal 1015 may include a transceiver 1000, a storage 1010, a display 1020, and a controller 1030.

The transceiver 1000 transmits/receives information that is required for the terminal 1015 to operate according to the present disclosure. If a subscription request message is received from an IoT device, the transceiver 1000 may transmit a subscription connection request message to a subscriber server. The subscription request message may include identification information of the IoT device, and the subscription connection request message may further include subscription terminal information of the terminal 1015 in addition to the identification information of the IoT device. Further, if the subscription of the IoT device is completed, the transceiver 1000 may receive a subscription connection response message. The transceiver 1000 may receive the connection identification information of the IoT device and the terminal through a subscription connection response message. Further, the transceiver 1000 may transmit a service plan change request message of the IoT device or a subscription connection release request message of the IoT device.

Further, the storage 1010 may store information that is required for the terminal 1015 to operate. The storage 1010 may store identification information of the IoT device that is received from the IoT device. Further, the storage 1010 may store connection identification information that is allocated from the subscriber server to the IoT device and the terminal 1015. Further, the storage may store at least one piece of usable service plan information that is received from the subscriber terminal to enable the user to select the service plan of the IoT device.

Further, the display 1020 may display information that is required for the terminal to operate according to the present disclosure. The display 1020 may display information of a subscription application for supporting the identification authentication procedure of the terminal 1015 or for supporting the user to select the service plan. Further, if a subscription connection response message is received in the case where the subscription procedure for the IoT device is completed, the display 1020 may display a message indicating that the subscription procedure is completed. Further, if the subscription information or the connection state of the IoT device is changed, the display 1020 may display a message that indicates such a state.

The controller 1030 receives the subscription request message including the identification information of the terminal 1015 from the electronic device, and transmits a subscription connection request message of the electronic device to the subscriber server. The subscription connection request message includes the subscription terminal information of the terminal 1015 and the identification of the electronic device, and if the electronic device has subscribed, the controller 1030 may operate to receive a subscription connection response message from the subscriber server. The subscription terminal information of the pre-subscribing terminal is used to acquire the subscription information of the electronic device to subscribe the electronic device.

Further, the controller 1030 may operate to receive at least one piece of service plan information for the electronic device from the subscriber server, to display the at least one piece of service plan information received, and to transmit one of the displayed pieces of service plan information, which is selected by the user, to the subscriber server.

The controller 1030 may further operate to transmit a service plan change request message of the electronic device that includes the connection identification information to the subscriber server, to receive at least one piece of service plan information that can be selected from the subscriber server, to display the at least one piece of service plan information received, to transmit one of the displayed pieces of service plan information that is selected by the user to the subscriber server, and to transmit a message that includes changed service plan information to the electronic device if a service plan information change response message including the connection identification information is received from the subscriber server.

Further, the controller 1030 may operate to transmit a subscriber handover request message including the connection identification information for the non-connected terminal to the subscriber server although the terminal 1015 is connected to the at least two subscribing electronic devices.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A subscriber server supporting subscription of an electronic device in a communication system, the subscriber server comprising:
    a transceiver configured to transmit and receive a signal; and
    at least one processor configured to:
        if a terminal is connected the electronic device, control the transceiver to receive, from the terminal, a first subscription connection request message of the electronic device, the first subscription connection request message including subscription terminal information of the terminal and identification information of the electronic device,
        authenticate a user of the terminal based on the subscription terminal information, and
        if the user authentication has succeeded, control the transceiver to transmit a second subscription connection request message of the electronic device to a support server,
    wherein the subscription terminal information of the terminal is used to acquire subscription information of the electronic device to subscribe the electronic device.

2. The subscriber server of claim 1,
    wherein the at least one processor is further configured to, if the user authentication has succeeded, generate connection identification information, and
    wherein the second subscription connection request message includes the connection identification information.

3. The subscriber server of claim 1,
    wherein the identification information includes at least one of an integrated circuit card identification (ICCID) or an international mobile equipment identity (IMEI), or
    wherein the subscription terminal information includes a mobile station international subscriber directory number (MSISDN).

4. The subscriber server of claim 2, wherein the identification information includes at least one of an embedded universal integrated circuit card (eUICC) identification (EID), a subscription manager—secure routing (SM-SR) identification (SR-ID), or an international mobile equipment identity (IMEI).

5. The subscriber server of claim 1,
    wherein the at least one processor is further configured to:
        control the transceiver to receive a charge change request message of the electronic device including connection identification information from the terminal,
        authenticate the user of the terminal on the basis of the connection identification information,
        if the user authentication has succeeded, change the subscription information of the electronic device, and
        request the support server to change a service plan on a basis of the subscription information of the electronic device, or
    wherein the at least one processor is further configured to:
        control the transceiver to receive a subscriber handover request message including the connection identification information from the terminal, and
        control the transceiver to transmit a connection change request message to the support server on the basis of the received subscriber handover request message, and
    wherein the subscriber handover request message includes a connection release request message for the electronic device and a connection request message for another electronic device that is different from the electronic device.

6. A support server supporting subscription of an electronic device in a communication system, the support server comprising:
    a transceiver configured to transmit and receive a signal; and
    at least one processor configured to:
        control the transceiver to receive a subscription connection request message of the electronic device from a subscriber server,
        acquire subscription information of the electronic device based on subscription terminal information of the terminal included in the subscription connection request message, and
        subscribe the electronic device based on subscription information of the electronic device and identification information of the electronic device included in the subscription connection request message,
    wherein, if the subscriber server authenticates a user of the terminal, the subscription connection request message of the electronic device is received, and
    wherein, if the terminal is connected to the electronic device, the subscription connection request message, which includes the subscription terminal information of the terminal and the identification information of the electronic device, is transmitted from the terminal to the subscriber server.

7. The support server of claim 6, wherein the subscription terminal information includes a mobile station international subscriber directory number (MSISDN), or wherein the identification information includes at least one of an integrated circuit card ID (ICCID) or an international mobile equipment identity (IMEI).

8. The support server of claim 6, wherein the identification information includes at least one of an embedded universal integrated circuit card (eUICC) identification (EID), a subscription manager—secure routing (SM-SR) identification (SR-ID), or an international mobile equipment identity (IMEI).

9. The support server of claim 6, wherein the at least one processor is further configured to register the identification information of the electronic device in a home subscriber server (HSS) and a subscriber profile repository (SPR) after the subscription of the electronic device.

10. A terminal supporting subscription of an electronic device in a communication system, the terminal comprising:
    a transceiver configured to transmit and receive a signal; and
    at least one processor configured to:
        if the terminal is connected to the electronic device, control the transceiver to receive, from the electronic device, a subscription connection request message including identification information of the electronic device,
        control the transceiver to transmit the subscription connection request message of the electronic device to a subscriber server, the subscription connection request message including subscription terminal information of the terminal and the identification information of the electronic device, and
        if the electronic device has subscribed, control the transceiver to receive a subscription connection response message from the subscriber server,
    wherein the subscription terminal information of the terminal is used to acquire subscription information of the electronic device to subscribe the electronic device.

11. The terminal of claim 10, wherein the subscription connection response message includes connection identification information generated by the subscriber server, or wherein the identification information includes at least one of an integrated circuit card ID (ICCID) or an international mobile equipment identity (IMEI).

12. The terminal of claim 10,
wherein the identification information includes at least one of an embedded universal integrated circuit card (eUICC) identification (EID), a subscription manager—secure routing (SM-SR) identification (SR-ID), or an international mobile equipment identity (IMEI), or wherein the at least one processor is further configured to:
    control the transceiver to receive at least one piece of service plan information for the electronic device from the subscriber server,
    control to display the received service plan information, and
    control the transceiver to transmit the service plan information selected by a user among the displayed service plan information to the subscriber server, or wherein the at least one processor is further configured to:
    control the transceiver to transmit a charge change request message of the electronic device including the connection identification information to the subscriber server,
    control the transceiver to receive at least one selectable service plan information from the subscriber server,
    control to display the received service plan information,
    control the transceiver to transmit the service plan information selected by the user among the displayed service plan information to the subscriber server, and
    if a service plan information change response message including the connection identification information is received from the subscriber server, control the transceiver to transmit a message including changed service plan information to the electronic device.

13. The terminal of claim 11,
wherein the at least one processor is further configured to transmit a subscriber handover request message including the connection identification information for a non-connected terminal, the terminal being connected to at least two subscribing electronic devices, and
wherein the subscriber handover request message includes a connection release request message for the electronic device that is being connected to the terminal and a connection request message for a non-connected electronic device among at least two subscribing electronic devices that are connected to the terminal.

14. A method for causing a subscriber server to support subscription of an electronic device in a communication system, the method comprising:
    if a terminal is connected to the electronic device, receiving, from the terminal, a first subscription connection request message of the electronic device, the first subscription connection request message including subscription terminal information of the terminal and identification information of the electronic device;
    authenticating a user of the terminal on based on the subscription terminal information; and
    if the user authentication has succeeded, transmitting a second subscription connection request message of the electronic device to a support server,
    wherein the subscription terminal information of the terminal is used to acquire subscription information of the electronic device to subscribe the electronic device.

15. The method of claim 14, further comprising:
    if the user authentication has succeeded, generating connection identification information,
    wherein the second subscription connection request message includes the connection identification information.

16. The method of claim 14,
wherein the identification information includes at least one of an integrated circuit card ID (ICCID) or an international mobile equipment identity (IMEI), and
wherein the subscription terminal information includes a mobile station international subscriber directory number (MSISDN).

17. The method of claim 15, further comprising:
    receiving a charge change request message of the electronic device including the connection identification information from the terminal;
    authenticating the user of the terminal on a basis of the connection identification information;
    if the user authentication has succeeded, changing the subscription information of the electronic device; and requesting the support server to change a service plan on a basis of the subscription information of the electronic device.

18. The method of claim 16, further comprising:
receiving a subscriber handover request message including the connection identification information from the terminal; and
transmitting a connection change request message to the support server on a basis of the received subscriber handover request message,
wherein the subscriber handover request message includes a connection release request message for the electronic device and a connection request message for another electronic device that is different from the electronic device.

19. A method for causing a support server to support subscription of an electronic device in a communication system, the method comprising:
receiving a subscription connection request message of the electronic device from a subscriber server;
acquiring subscription information of the electronic device based on subscription terminal information of the terminal included in the subscription connection request message; and
subscribing the electronic device based on subscription information of the electronic device and identification information of the electronic device included in the subscription connection request message,
wherein, if the subscriber server authenticates a user of the terminal, the subscription connection request message of the electronic device is received, and
wherein, if the terminal is connected to the electronic device, the subscription connection request message, which includes the subscription terminal information of the terminal and the identification information of the electronic device, is transmitted from the terminal to the subscriber server.

20. A method for causing a terminal to support subscription of an electronic device in a communication system, the method comprising:
if the terminal is connected to the electronic device, receiving, from the electronic device, a subscription connection request message including identification information of the electronic device;
transmitting the subscription connection request message of the electronic device to a subscriber server, the subscription connection request message including subscription terminal information of the terminal and the identification information of the electronic device; and
if the electronic device has subscribed, receiving a subscription connection response message from the subscriber server,
wherein the subscription terminal information of the terminal is used to acquire subscription information of the electronic device to subscribe the electronic device.

* * * * *